US011234218B2

(12) United States Patent
Sun et al.

(10) Patent No.: US 11,234,218 B2
(45) Date of Patent: Jan. 25, 2022

(54) DESCRIPTOR CHANNEL DESIGNS FOR UPLINK CHANNELS IN A SHARED RADIO FREQUENCY SPECTRUM BAND

(71) Applicant: QUALCOMM Incorporated, San Diego, CA (US)

(72) Inventors: Jing Sun, San Diego, CA (US); Taesang Yoo, Riverside, CA (US); Juan Montojo, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 285 days.

(21) Appl. No.: 15/351,216

(22) Filed: Nov. 14, 2016

(65) Prior Publication Data

US 2017/0215171 A1 Jul. 27, 2017

Related U.S. Application Data

(60) Provisional application No. 62/286,710, filed on Jan. 25, 2016.

(51) Int. Cl.
*H04W 72/04* (2009.01)
*H04L 5/00* (2006.01)
(Continued)

(52) U.S. Cl.
CPC .......... *H04W 72/04* (2013.01); *H04L 5/0053* (2013.01); *H04L 5/0091* (2013.01);
(Continued)

(58) Field of Classification Search
CPC .......... H04W 72/042; H04W 72/0413; H04W 52/146; H04W 72/0453; H04W 72/04;
(Continued)

(56) References Cited

U.S. PATENT DOCUMENTS 9,565,011 B2 2/2017 Palanki et al.
2007/0286066 A1* 12/2007 Zhang .................. H04L 5/0058
370/208

(Continued)

FOREIGN PATENT DOCUMENTS

| CN | 102655684 A | 9/2012 |
| CN | 104205972 A | 12/2014 |
| WO | WO-2010141912 A2 | 12/2010 |

OTHER PUBLICATIONS

ISA/EP, International Search Report and Written Opinion of the International Searching Authority, Int'l Application No. PCT/US2016/064745, dated Mar. 2, 2017, European Patent Office, Rijswijk, NL, 11 pgs.

*Primary Examiner* — Asad M Nawaz
*Assistant Examiner* — Najeeb Ansari
(74) *Attorney, Agent, or Firm* — Qualcomm Incorporated

(57) ABSTRACT

Methods, systems, and apparatuses for uplink descriptor channels are described. An uplink descriptor channel may be used by a user equipment (UE) for providing indications that uplink transmissions over allocated uplink data resources are sent in a configuration different from a configuration indicated by an uplink grant. In various examples an uplink transmission may be transmitted by a UE, and received by a base station, and the uplink transmission may include the uplink descriptor channel with uplink data. An uplink descriptor channel may include indications that uplink control information is included in the uplink transmission, and/or that the uplink transmission employs a number of transmission intervals, a number of channels, and/or a different MCS than those indicated by the uplink grant. A base station may receive the uplink descriptor channel and adjust various parameters of decoding an uplink transmission and/or allocating radio frequency spectrum resources.

30 Claims, 14 Drawing Sheets

(51) Int. Cl.
  *H04W 72/12* (2009.01)
  *H04W 72/14* (2009.01)
  *H04W 88/02* (2009.01)
  *H04W 88/08* (2009.01)

(52) U.S. Cl.
  CPC ....... *H04W 72/1284* (2013.01); *H04W 72/14* (2013.01); *H04W 88/02* (2013.01); *H04W 88/08* (2013.01)

(58) Field of Classification Search
  CPC ......... H04W 72/1289; H04W 72/1268; H04W 74/006
  See application file for complete search history.

(56) References Cited

U.S. PATENT DOCUMENTS

| | | | |
|---|---|---|---|
| 2010/0113077 A1* | 5/2010 | Lee | H04W 52/12 455/501 |
| 2010/0144360 A1* | 6/2010 | Okuda | H04W 72/042 455/450 |
| 2011/0205997 A1* | 8/2011 | Chun | H04L 5/0053 370/329 |
| 2013/0039231 A1 | 2/2013 | Wang | |
| 2013/0250924 A1 | 9/2013 | Chen et al. | |
| 2013/0301573 A1* | 11/2013 | Jung | H04W 52/146 370/329 |
| 2014/0241377 A1* | 8/2014 | Pantelias | H04L 12/403 370/449 |
| 2014/0269454 A1* | 9/2014 | Papasakellariou | H04W 52/34 370/280 |
| 2015/0078271 A1* | 3/2015 | Kim | H04B 7/0417 370/329 |
| 2015/0341921 A1 | 11/2015 | Chen et al. | |
| 2016/0150490 A1* | 5/2016 | Ouchi | H04W 72/12 455/522 |
| 2016/0323901 A1* | 11/2016 | Yum | H04W 72/085 |
| 2017/0208582 A1* | 7/2017 | Liang | H04W 24/00 |
| 2018/0131473 A1* | 5/2018 | Moon | H04L 5/0051 |

* cited by examiner

DESCRIPTOR CHANNEL DESIGNS FOR UPLINK CHANNELS IN A SHARED RADIO FREQUENCY SPECTRUM BAND

CROSS REFERENCES

The present Application for Patent claims priority to U.S. Provisional Patent Application No. 62/286,710 by SUN, et al., entitled "DESCRIPTOR CHANNEL DESIGNS FOR UPLINK CHANNELS IN A SHARED RADIO FREQUENCY SPECTRUM BAND," filed Jan. 25, 2016, assigned to the assignee hereof, the entirety of which is incorporated by reference herein for any and all purposes.

BACKGROUND

Field of the Disclosure

The present disclosure, for example, relates to wireless communication systems, and more specifically to descriptor channel designs for uplink channels in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may allow communication between a base station and a UE over a shared radio frequency spectrum, or over different radio frequency spectrums (e.g., a dedicated radio frequency spectrum and a shared radio frequency spectrum) of a cellular network. With increasing data traffic in cellular networks that use a dedicated (e.g., licensed) radio frequency spectrum, offloading of at least some data traffic to a shared radio frequency spectrum may provide a cellular operator with opportunities for enhanced data transmission capacity. A shared radio frequency spectrum may also provide service in areas where access to a dedicated radio frequency spectrum is unavailable.

In some wireless communications systems a base station may coordinate aspects of the allocation of radio frequency spectrum resources. For example, a base station may identify available radio frequency spectrum resources, and allocate portions of the resources to UEs being served by the base station. In some examples the base station may have downlink data to transmit to a UE, and the base station may transmit the downlink data with a downlink grant in a downlink transmission. The UE may receive the downlink transmission, and based on indications of the downlink grant the UE may receive and decode portions of the downlink transmission containing the downlink data. After receiving the downlink transmission, the UE may respond to the base station by transmitting uplink control information (UCI), such as acknowledgement information indicating whether the downlink data was received properly. Generally, UCI is transmitted over radio frequency spectrum resources allocated for control information via explicit or implicit assignment. If the downlink grant is not received by the UE, the UE may not send UCI to the base station. In some examples, if a base station does not receive UCI, the base station may not be able to determine whether the downlink grant was not received by the UE (and the UE consequently did not send the UCI), or that the downlink grant was received by the UE, and transmitted UCI from the UE was otherwise prevented from being received by the base station.

Some wireless communications systems may employ transmissions over a shared radio frequency spectrum band, such as an unlicensed radio frequency spectrum band, and transmitting devices may need to contend for access before transmitting over the shared radio frequency spectrum band. In some examples, however, the transmission of some types of information (e.g., control information) may be permitted over a shared wireless frequency spectrum band without contending for access. Such wireless communications systems may be prone to interference, as nearby devices may be concurrently transmitting over the same radio frequency spectrum resources. Therefore, a wireless communications system that allows transmissions of some types of information without contending for access may experience a higher level of communication errors, or may require higher transmission redundancy that reduces utilization efficiency, than a wireless communications system in which devices contend for access prior to transmitting those types of information.

In some examples a base station may receive a request for uplink resources of a shared radio frequency spectrum band from a UE that has uplink data to send to the base station. The base station may respond by allocating uplink data channel resources for the UE and may subsequently transmit an uplink grant. The uplink grant may include indications of the allocated uplink data channel resources, along with other parameters the UE may employ in transmitting the uplink data. The UE may receive the uplink grant, and subsequently transmit the uplink data according to the indications and/or parameters of the uplink grant. In some examples, the allocated uplink data channel resources, or the parameters for utilizing such resources as indicated in an uplink grant, may not match the needs of a UE with respect to transmitting uplink data, which may result in an inefficient allocation of radio frequency spectrum resources. Therefore, improvements in efficiency of utilization of radio frequency spectrum resources may be desired.

SUMMARY

Systems, methods, and apparatuses for uplink descriptor channel designs are described for use in a wireless communications system employing a shared radio frequency spectrum band. In some examples a base station may identify available resources of a shared radio frequency spectrum band, and allocate uplink data channel resources of the shared radio frequency spectrum band for a UE served by the base station. The base station may subsequently transmit an uplink grant indicating the uplink data channel resources allocated for the UE, along with information regarding the utilization of the allocated resources (e.g., uplink transmission configuration parameters). After receiving the uplink grant from the base station, the UE may determine an uplink configuration for using the allocated resources for an uplink transmission, and configure an uplink descriptor channel for transmitting indications associated with the uplink configuration determined by the UE. The uplink descriptor channel may be transmitted by the UE along with uplink data in an uplink transmission over the allocated uplink data channel resources, and may be located in a predetermined portion of the allocated resources.

In some examples the uplink descriptor channel may include an indication that UCI is present in the uplink transmission, and if present, an indication of the format of the UCI. Additionally or alternatively, the uplink descriptor channel may include an indication that the allocated uplink data channel resources are utilized in a configuration different from a configuration indicated by the uplink grant received by the UE. For example, the uplink descriptor channel may include an indication that the UE employs a number of transmission intervals (e.g., a number of transmission time intervals (TTIs), a number of subframes, etc.), a number of frequency channels, or a modulation and coding scheme (MCS) different from those indicated by the uplink grant received by the UE. The base station may receive the uplink descriptor channel, and decode the uplink transmission according to one or more indications included in the uplink descriptor channel. By employing the described uplink descriptor channel, a base station or a UE of a wireless communications system may utilize resources of a shared radio frequency spectrum band more efficiently.

A method of wireless communication at a UE is described. The method may include receiving, from a base station, an uplink grant identifying uplink data channel resources identified by the base station as available for the UE, the identified uplink data channel resources including one or more granted transmission intervals for one or more channels of a shared radio frequency spectrum band; determining, by the UE, an uplink configuration for using the identified uplink data channel resources for an uplink transmission; and transmitting, using at least a portion of the identified uplink data channel resources, the uplink transmission including uplink data and an uplink descriptor channel, the uplink descriptor channel including one or more parameters indicating the uplink configuration determined by the UE.

An apparatus for wireless communication by a UE is described. The apparatus may include means for receiving, from a base station, an uplink grant identifying uplink data channel resources identified by the base station as available for the UE, the identified uplink data channel resources including one or more granted transmission intervals for one or more channels of a shared radio frequency spectrum band; means for determining, by the UE, an uplink configuration for using the identified uplink data channel resources for an uplink transmission; and means for transmitting, using at least a portion of the identified uplink data channel resources, the uplink transmission including uplink data and an uplink descriptor channel, the uplink descriptor channel including one or more parameters indicating the uplink configuration determined by the UE.

Another apparatus for wireless communication by a UE is described. The apparatus may include a processor, memory in electronic communication with the processor, and instructions stored in the memory. The instructions may be operable, when executed by the processor, to cause the apparatus to receive, from a base station, an uplink grant identifying uplink data channel resources identified by the base station as available for the UE, the identified uplink data channel resources including one or more granted transmission intervals for one or more channels of a shared radio frequency spectrum band; determine an uplink configuration for using the identified uplink data channel resources for an uplink transmission; and transmit, using at least a portion of the identified uplink data channel resources, the uplink transmission including uplink data and an uplink descriptor channel, the uplink descriptor channel including one or more parameters indicating the uplink configuration determined by the UE.

A non-transitory computer readable medium for wireless communication by a UE is described. The non-transitory computer-readable medium may include instructions executable by a processor to receive, from a base station, an uplink grant identifying uplink data channel resources identified by the base station as available for the UE, the identified uplink data channel resources including one or more granted transmission intervals for one or more channels of a shared radio frequency spectrum band; determine an uplink configuration for using the identified uplink data channel resources for an uplink transmission; and transmit, using at least a portion of the identified uplink data channel resources, the uplink transmission including uplink data and an uplink descriptor channel, the uplink descriptor channel including one or more parameters indicating the uplink configuration determined by the UE.

In some examples of the method, apparatuses, or non-transitory computer-readable medium, the uplink descriptor channel may include an indication of whether UCI is present in the uplink transmission.

In some examples of the method, apparatuses, or non-transitory computer-readable medium, the uplink descriptor channel may include an indication of a format of UCI present in the uplink transmission.

Some examples of the method, apparatuses, or non-transitory computer-readable medium may include operations, features, means, or instructions for rate matching UCI around the uplink descriptor channel prior to transmitting the uplink transmission.

Some examples of the method, apparatuses, or non-transitory computer-readable medium may include operations, features, means, or instructions for rate matching the uplink data around the uplink descriptor channel and the UCI prior to transmitting the uplink transmission.

Some examples of the method, apparatuses, or non-transitory computer-readable medium may include operations, features, means, or instructions for configuring the UCI to be transmitted with a same rank as the uplink data, a same precoding matrix indicator (PMI) as the uplink data, a same modulation order as the uplink data, or a combination thereof.

In some examples of the method, apparatuses, or non-transitory computer-readable medium, the uplink descriptor channel may include an indication that the uplink transmission spans a number of transmission intervals that is different from a number of the granted transmission intervals.

In some examples of the method, apparatuses, or non-transitory computer-readable medium, the uplink descriptor channel may include an indication that the UE employs an MCS for the transmitting that is different from an MCS included in the uplink grant.

In some examples of the method, apparatuses, or non-transitory computer-readable medium, the uplink descriptor channel may include an indication that the uplink transmission includes a number of channels that is different from a number of channels of the identified uplink data channel resources.

In some examples of the method, apparatuses, or non-transitory computer-readable medium, the identified uplink data channel resources may include a set of channels of the shared radio frequency spectrum band, and the uplink descriptor channel may be spread across one or more of the set of channels.

In some examples of the method, apparatuses, or non-transitory computer-readable medium, the uplink descriptor channel may be transmitted by the UE in a predetermined portion of the identified uplink data channel resources.

In some examples of the method, apparatuses, or non-transitory computer-readable medium, the predetermined portion of the identified uplink data channel resources may include a beginning portion of the identified uplink data channel resources.

Some examples of the method, apparatuses, or non-transitory computer-readable medium may include operations, features, means, or instructions for configuring the uplink descriptor channel to be transmitted with a same rank as the uplink data, a same PMI as the uplink data, a same modulation order as the uplink data, or a combination thereof.

Some examples of the method, apparatuses, or non-transitory computer-readable medium may include operations, features, means, or instructions for selecting a set of channels from the one or more channels of the identified uplink data channel resources. Some examples of the method, apparatuses, or non-transitory computer-readable medium may include operations, features, means, or instructions for performing a clear channel assessment (CCA) for each channel from the selected set of channels, wherein the uplink descriptor channel includes an indication of those channels from the selected set of channels for which the respective CCA was successful.

A method of wireless communication is described. The method may include allocating uplink data channel resources for a UE, the allocated uplink data channel resources comprising one or more granted transmission intervals for one or more channels of a shared radio frequency spectrum band; transmitting an uplink grant identifying the allocated uplink data channel resources; and receiving an uplink transmission from the UE over at least a portion of the allocated uplink data channel resources, the uplink transmission comprising uplink data and an uplink descriptor channel, the uplink descriptor channel comprising one or more parameters indicating an uplink configuration determined by the UE for using the allocated uplink data channel resources for the uplink transmission.

An apparatus for wireless communication is described. The apparatus may include means for allocating uplink data channel resources for a UE, the allocated uplink data channel resources comprising one or more granted transmission intervals for one or more channels of a shared radio frequency spectrum band; means for transmitting an uplink grant identifying the allocated uplink data channel resources; and means for receiving an uplink transmission from the UE over at least a portion of the allocated uplink data channel resources, the uplink transmission comprising uplink data and an uplink descriptor channel, the uplink descriptor channel comprising one or more parameters indicating an uplink configuration determined by the UE for using the allocated uplink data channel resources for the uplink transmission.

Another apparatus is described. The apparatus may include a processor, memory in electronic communication with the processor, and instructions stored in the memory. The instructions may be operable, when executed by the processor, to cause the apparatus to allocate uplink data channel resources for a UE, the allocated uplink data channel resources comprising one or more granted transmission intervals for one or more channels of a shared radio frequency spectrum band; transmit an uplink grant identifying the allocated uplink data channel resources; and receive an uplink transmission from the UE over at least a portion of the allocated uplink data channel resources, the uplink transmission comprising uplink data and an uplink descriptor channel, the uplink descriptor channel comprising one or more parameters indicating an uplink configuration determined by the UE for using the allocated uplink data channel resources for the uplink transmission.

A non-transitory computer readable medium for wireless communication is described. The non-transitory computer-readable medium may include instructions executable by a processor to allocate uplink data channel resources for a UE, the allocated uplink data channel resources comprising one or more granted transmission intervals for one or more channels of a shared radio frequency spectrum band; transmit an uplink grant identifying the allocated uplink data channel resources; and receive an uplink transmission from the UE over at least a portion of the allocated uplink data channel resources, the uplink transmission comprising uplink data and an uplink descriptor channel, the uplink descriptor channel comprising one or more parameters indicating an uplink configuration determined by the UE for using the allocated uplink data channel resources for the uplink transmission.

In some examples of the method, apparatuses, or non-transitory computer-readable medium, the uplink descriptor channel may include an indication of whether UCI from the UE is present in the uplink transmission Some examples of the method, apparatuses, or non-transitory computer-readable medium may further include operations, features, means, or instructions for transmitting a downlink grant identifying downlink information for the UE, and determining that the downlink grant was not received by the UE based at least in part on the uplink descriptor channel indicating that no UCI is present in the received uplink transmission.

In some examples of the method, apparatuses, or non-transitory computer-readable medium, the uplink descriptor channel may include an indication that the uplink transmission is being transmitted over a number of transmission intervals that is different from a number of the granted transmission intervals.

Some examples of the method, apparatuses, or non-transitory computer-readable medium may include operations, features, means, or instructions for reallocating a portion of the number of the granted transmission intervals for the one or more channels of the shared radio frequency spectrum band to subsequent transmissions based at least in part on the indication that the uplink transmission has been transmitted over the number of transmission intervals that is different from the number of the granted transmission intervals.

In some examples of the method, apparatuses, or non-transitory computer-readable medium, the uplink grant may include an indicator of an MCS, and the uplink descriptor channel may include an indication that the uplink transmission is transmitted with an MCS that is different from the MCS indicated by the uplink grant.

In some examples of the method, apparatuses, or non-transitory computer-readable medium, the uplink grant may include a number of granted channels, and the uplink descriptor channel may include an indication that the uplink transmission is being transmitted over a number of channels that is different from the number of granted channels.

Some examples of the method, apparatuses, or non-transitory computer-readable medium above may include operations, features, means, or instructions for decoding the uplink descriptor channel from a predetermined portion of the received uplink transmission.

Some examples of the method, apparatuses, or non-transitory computer-readable medium may include operations, features, means, or instructions for decoding at least a portion of the received uplink transmission based on the uplink descriptor channel.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
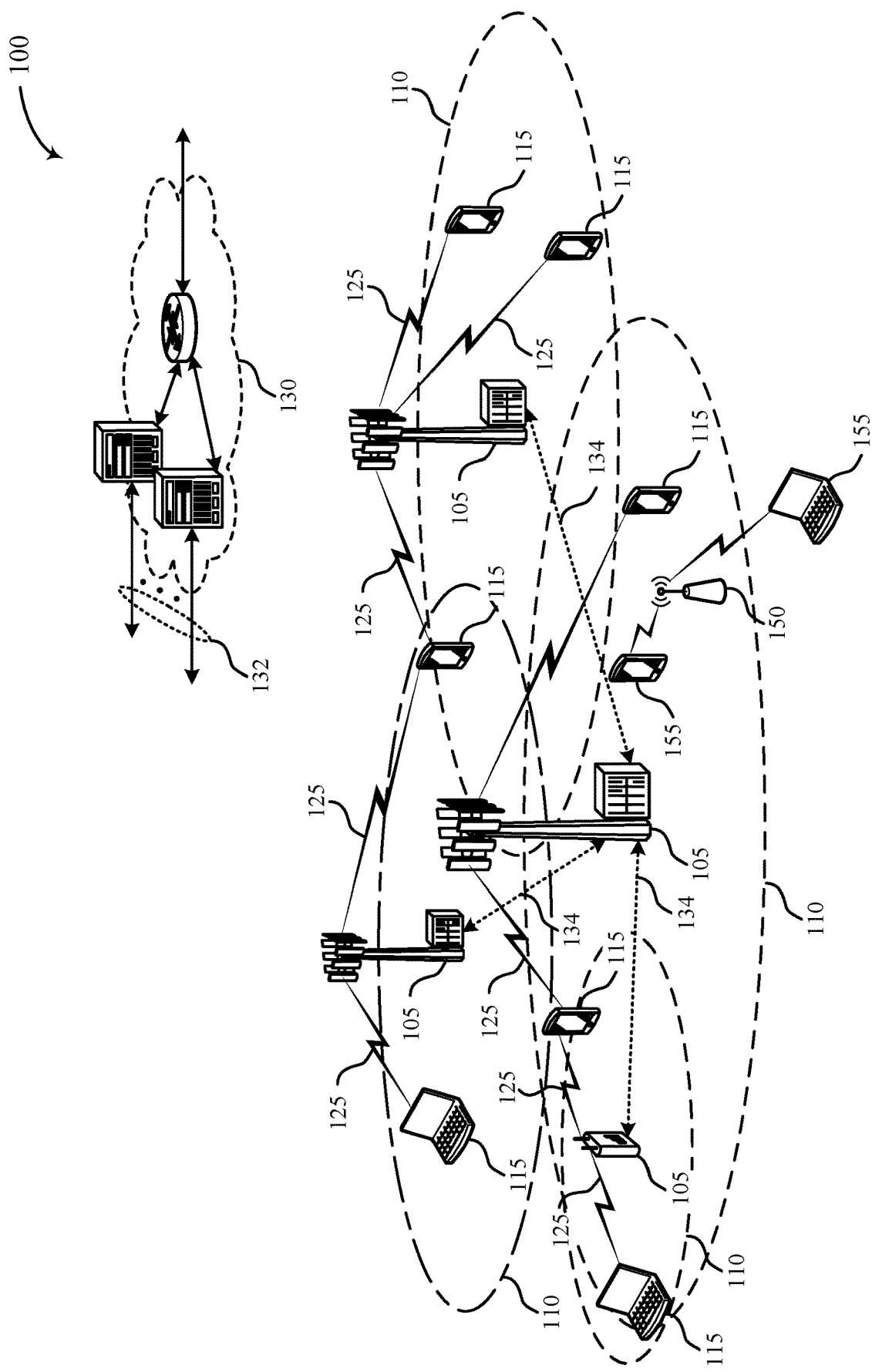
FIG. 1 shows a diagram of a wireless communication environment comprising devices configured for employing an uplink descriptor channel, in accordance with aspects of the present disclosure.

The techniques described in the present disclosure are generally related to uplink descriptor channel designs for use in a wireless communications system employing a shared radio frequency spectrum band. The shared radio frequency spectrum band may include multiple frequency channels for which coexistence of multiple devices is controlled according to a channel reservation and contention resolution procedure. A multiple access system operating in environments where multiple technologies access the same shared radio frequency spectrum band may additionally schedule uplink transmission resources among multiple served UEs. Thus, a base station may transmit uplink grants, indicate uplink data channel resources allocated for various UEs (e.g., a number of frequency channels, a number of transmission intervals, etc.), along with indications regarding the utilization of the allocated resources (e.g., an MCS, etc.). However, access to the granted uplink data channel resources by the UEs with regard to other devices (not in the set of served UEs) is subject to the channel reservation and contention resolution procedure for the shared radio frequency spectrum band.

According to aspects of the present disclosure, a UE may convey an uplink descriptor channel along with uplink data in an uplink transmission over one or more of the allocated uplink data channel resources (e.g., following a successful CCA) providing indications to the base station regarding how the allocated uplink data channel resources are used by the UE. For example, the uplink descriptor channel may include one or more parameters indicating an uplink configuration determined by the UE. The uplink descriptor channel may assist in resolving ambiguity between use of the allocated uplink data channel resources and other resources (e.g., non-CCA resources, dedicated radio frequency spectrum resources, etc.). The uplink descriptor channel may be transmitted in predefined resources of the uplink transmission over the allocated uplink data channel resources (e.g., at the beginning of an uplink transmission burst from the UE).

In some examples, the uplink descriptor channel may include an indication that UCI is present in the uplink transmission, which may further include an indication of the format of the UCI (e.g., a location of the UCI). In some cases, UCI may be associated with data (e.g., hybrid automatic repeat request (HARQ) acknowledgement (ACK) or non-acknowledgement (NACK) information associated with a downlink transmission). Additionally or alternatively, UCI may be non-data associated (e.g., channel quality indicators (CQI), channel state information (CSI), rank indicator (RI), precoding matrix indicator (PMI), scheduling requests, etc.). An indication of the format of the UCI may, for example, indicate a size of the encoded UCI or which portions of the uplink transmission include UCI, such as specific resource blocks of the uplink transmission.

Additionally or alternatively, the uplink descriptor channel may include an indication that the allocated uplink data channel resources are utilized by the UE in a configuration different from a configuration indicated by the uplink grant sent by the base station. For example, the uplink descriptor channel may include an indication that the UE employs a number of transmission intervals (e.g., a number of TTIs, a number of subframes, etc.), a number of frequency channels, or an MCS different from those indicated by the uplink grant received by the UE. The modified use of allocated uplink data channel resources may be a result, for example, of a determination by the UE that uplink data buffered for transmission does not require the entirety of resources allocated by the base station and indicated in the uplink grant. Thus, in some examples a UE may indicate in an uplink descriptor channel that only a subset of the number of allocated transmission intervals are employed, and/or that only a subset of the number of allocated frequency channels are employed. Additionally or alternatively, the UE may indicate in an uplink descriptor channel that a different MCS may be used, such as an MCS with a lower modulation order or lower coding rate in order to improve communication robustness.

A base station may receive an uplink transmission from a UE, which may include an uplink descriptor channel. The base station may decode the indications in the uplink descriptor channel and decode the uplink transmission according to one or more indications included in the uplink descriptor channel. For example, the base station may decode UCI that was indicated by the uplink descriptor channel to be included in the uplink transmission. Additionally or alternatively, the base station may determine that the uplink transmission from the UE utilizes the allocated resources in a configuration different from a configuration indicated by the uplink grant (e.g., spans a different number of transmission intervals, employs a different number of frequency channels, and/or employs a different MCS than indicated in the uplink grant for the UE). In some examples the base station may reallocate radio frequency spectrum resources based on indications of the uplink descriptor channel, such as reallocating a number of transmission intervals and/or a number of frequency channels not used by the UE for the uplink transmission. The reallocated resources may, for example, be allocated to subsequent transmissions over the shared radio frequency spectrum band, which may include subsequent transmissions by devices other than the UE that the resources were originally allocated to (e.g., the base station, other UEs, etc.). The described aspects of an uplink descriptor channel may allow a wireless communications system to utilize resources of a shared radio frequency spectrum band more efficiently.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in other examples.

FIG. 1 shows a diagram of a wireless communications environment 100, comprising devices configured for employing an uplink descriptor channel, in accordance with aspects of the present disclosure. The wireless communications environment 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications environment 100 may include base stations 105 of different types (e.g., macro or small cell base stations). There may be overlapping geographic coverage areas 110 for different technologies.

In some examples, the wireless communications environment 100 is a Long Term Evolution (LTE) or LTE-Advanced (LTE-A) network. In LTE/LTE-A networks, the term evolved node B (eNB) may be generally used to describe the base stations 105, while the term UE may be generally used to describe the UEs 115. The wireless communications environment 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications environment 100 may support synchronous or asynchronous operation. For synchronous operation, the base stations 105 may have similar frame timing, and transmissions from different base stations 105 and/or transmissions over different frequency channels may be approximately aligned in time. For asynchronous operation, the base stations 105 may have different frame timing, and transmissions from different base stations 105 and/or transmissions over different frequency channels may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications environment 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like. A UE may be able to communicate with various types of base stations and network equipment including macro eNBs, small cell eNBs, relay base stations, and the like.

The communication links 125 shown in wireless communications environment 100 may include uplink transmissions from a UE 115 to a base station 105, or downlink transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communications environment 100, base stations 105 or UEs 115 may include multiple antennas for employing antenna diversity schemes to improve communication quality and reliability between base stations 105 and UEs 115. For example, base stations 105 and/or UEs 115 may employ receive diversity, beamforming, or multiple input multiple output (MIMO) techniques that may take advantage of multi-path environments to transmit multiple spatial layers carrying the same or different coded data.

Wireless communications environment 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, the wireless communications environment 100 may operate according to a first radio access technology (e.g., a cellular radio access technology, such as an LTE/LTE-A technology), but operate in the presence of one or more networks or nodes operating according to a second radio access technology (e.g., a Wi-Fi technology). By way of example, wireless communications environment 100 includes a Wi-Fi network comprised of a Wi-Fi access point (AP) 150 in communication with Wi-Fi stations (STAs) 155. In some examples, a UE 115 or base station 105 may support operation using LTE communication protocols in unlicensed radio frequency spectrum bands, which may be referred to as LTE-U operation. LTE-U operations may include features for coexistence between LTE communication protocols and Wi-Fi communication protocols. In the interest of clarity, LTE-U capable devices will be referred to as base stations 105 or UEs 115 and non LTE-U capable devices will be referred to as APs 150 or STAs 155. However, it should be understood that STA 155 or AP 150 may be Wi-Fi devices that support LTE but may not be configured for LTE-U operation.

According to aspects of the present disclosure, base stations 105 and UEs 115 may be configured to employ an uplink descriptor channel that includes one or more parameters indicating an uplink configuration determined by a UE for uplink transmissions from a UE 115 to a base station 105. In some examples a base station 105 may identify available resources of a shared radio frequency spectrum band, and allocate uplink data channel resources of the shared radio frequency spectrum band for a UE 115 served by the base station. The base station 105 may subsequently transmit an uplink grant identifying the uplink data channel resources allocated for the UE 115, which may also include information regarding the utilization of the allocated resources (e.g., uplink transmission configuration parameters determined by the base station). After receiving the uplink grant from the base station 105, the UE 115 may determine an uplink configuration for using the identified uplink data channel resources, which may be different from, and/or include further parameters than an uplink configuration indicated by the base station. The UE may subsequently configure an uplink descriptor channel for transmitting indications associated with how the allocated uplink data channel resources are used by the UE 115. The uplink descriptor channel may include one or more parameters indicating the uplink configuration determined by the UE, and may be transmitted by the UE 115 along with uplink data in an uplink transmission over the allocated uplink data channel resources.

In some examples, the uplink descriptor channel may include an indication of whether UCI is present in the uplink transmission from the UE 115, which may include an indication of the format of the UCI. Additionally or alternatively, the uplink descriptor channel may include an indication that the allocated uplink data channel resources are utilized by the UE 115 in a configuration different from a configuration indicated by the uplink grant received by the UE 115. For example, the uplink descriptor channel may include an indication that the UE 115 employs a number of transmission intervals (e.g., a number of subframes, a number of TTIs, etc.), a number of frequency channels, or an MCS different from those indicated by the uplink grant received by the UE 115. The uplink descriptor channel may be located in a predetermined portion of the uplink transmission, which may be a mapping as a physical channel at the PHY layer. In some examples the uplink descriptor channel may follow a demodulation reference signal (DMRS), such that a single DMRS can be used for both the uplink descriptor channel and the remaining portions of the uplink transmission. In some examples, the uplink descriptor channel may be located at the beginning of an uplink burst. The base station 105 may receive the uplink descriptor channel, and decode the uplink transmission according to one or more indications included in the uplink descriptor channel. By employing the described aspects of an uplink descriptor channel, the wireless communications environment 100 may utilize resources of a shared radio frequency spectrum band more efficiently.

Figure 2:
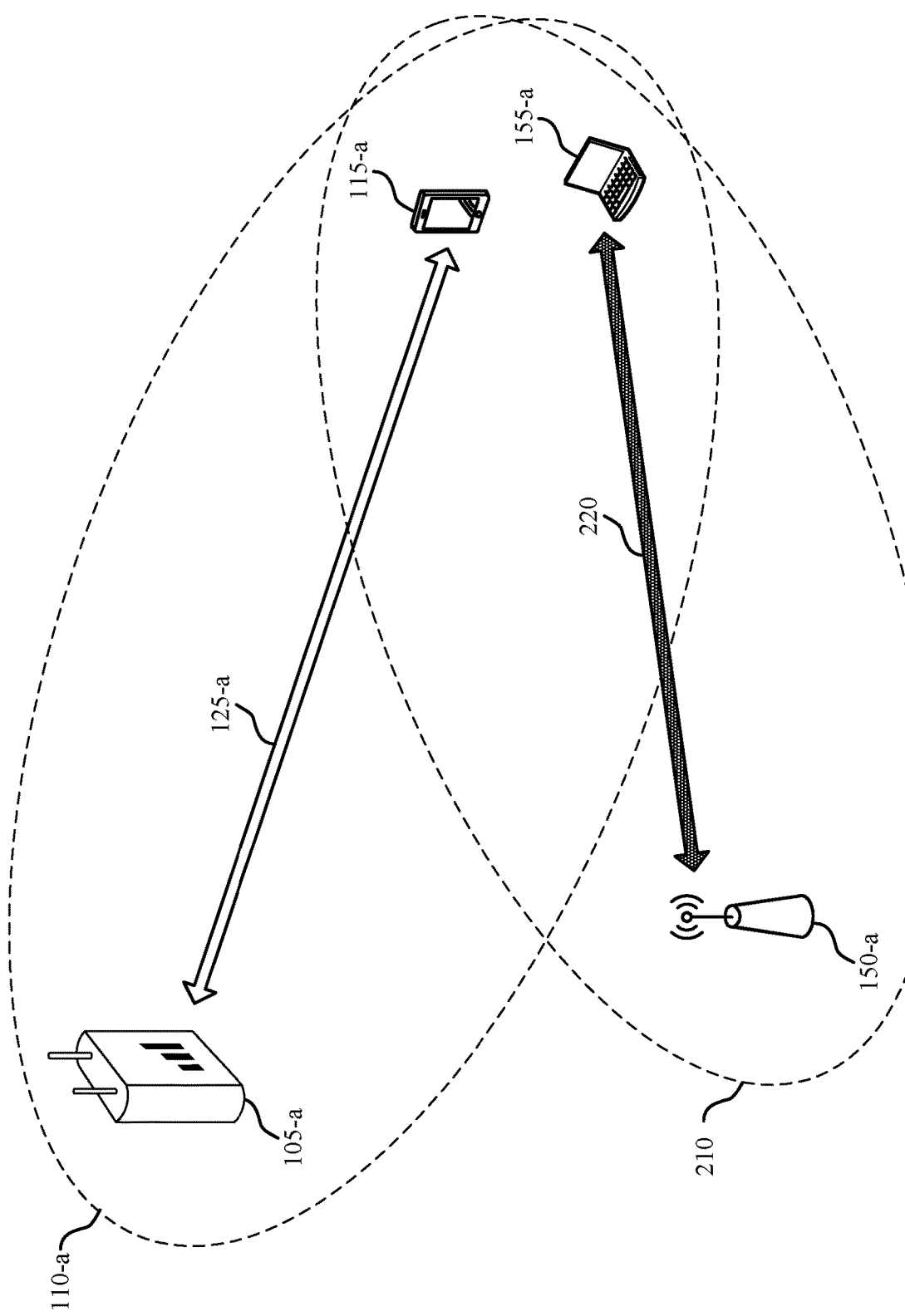
FIG. 2 shows a diagram of a wireless communication environment comprising a base station and a UE configured for employing an uplink descriptor channel, in accordance with aspects of the present disclosure.

FIG. 2 illustrates an example of a wireless communications environment 200 comprising a base station 105-*a* and a UE 115-*a* configured for employing an uplink descriptor channel, in accordance with aspects of the present disclosure. Base station 105-*a* and UE 115-*a* may communicate with each other using a first communications protocol (e.g., LTE/LTE-A) over a dedicated (e.g., licensed) radio frequency spectrum band, a shared (e.g., unlicensed) radio frequency spectrum band, or both. Base station 105-*a* and UE 115-*a* may communicate over communication link 125-*a* supporting the first communications protocol. AP 150-*a* and STA 155-*a* may communicate with one another using a second communications protocol (e.g., Wi-Fi) over the shared radio frequency spectrum band. AP 150-*a* and STA 155-*a* may communicate over communication link 220 supporting the second communications protocol. Communication link 125-*a* and communication link 220 may provide for uplink and downlink communication. In one example, UE 115-*a* and base station 105-*a* may be LTE-U capable devices and STA 155-*a* and AP 150-*a* may be Wi-Fi devices, as described above with reference to FIG. 1.

Base station 105-*a* communicates via communication link 125-*a* and may provide communication coverage for a respective geographic coverage area 110-*a*, as described with reference to FIG. 1. Further, AP 150-*a* may provide coverage for a second protocol coverage area 210. Geographic coverage area 110-*a* and second protocol coverage area 210 may overlap. UE 115-*a* and STA 155-*a* may be located in a region of coverage overlap and may be prone to interference from transmissions of communication links 220 and 125-*a*, respectively. Transmissions from other communication links 125 or 220 over the same radio frequency spectrum resources in overlapping coverage areas may result in UE 115-*a* being unable to effectively receive or transmit over frequency spectrum resources.

Figure 3:
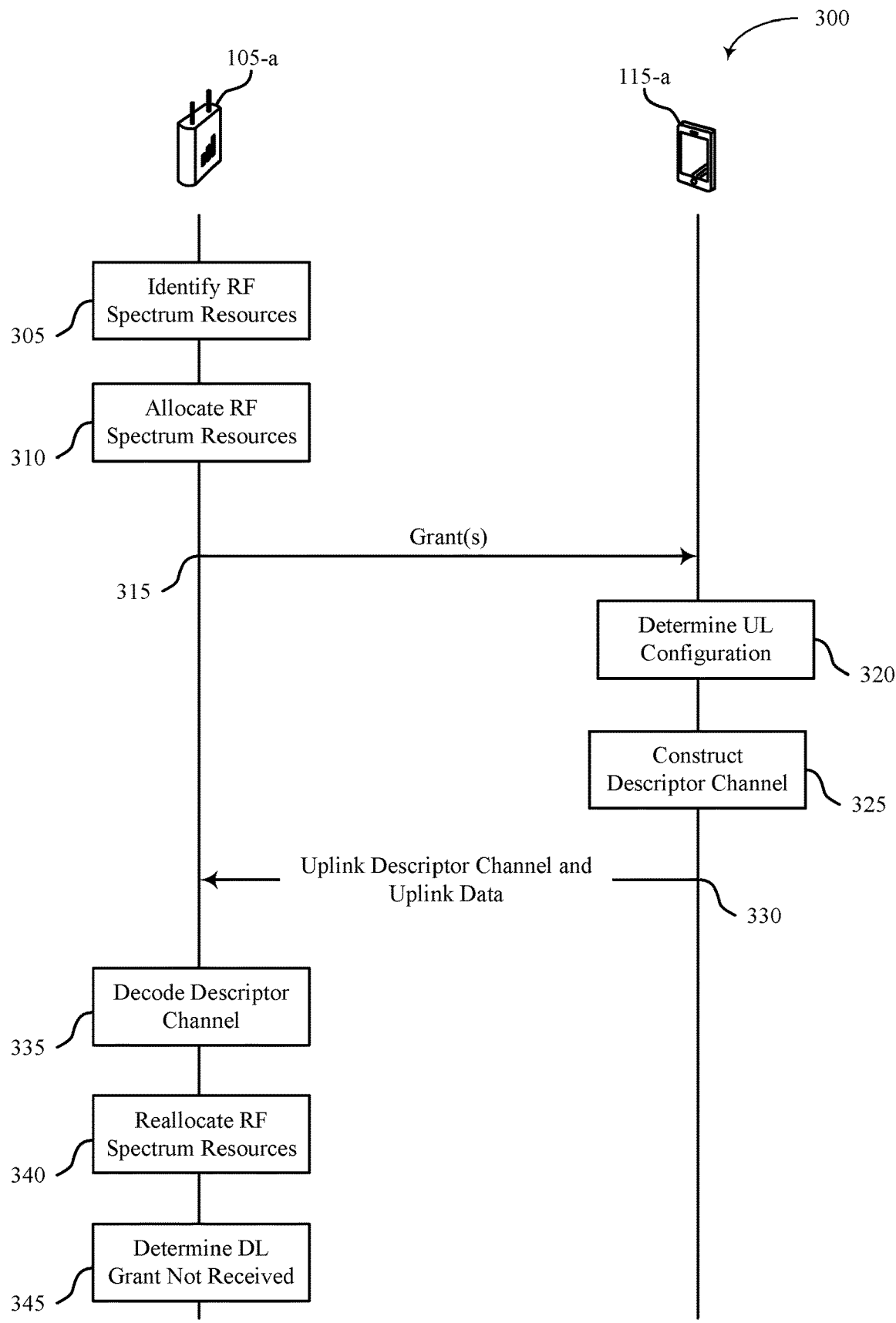
FIG. 3 shows a flow diagram of wireless communications between a base station and a UE including a uplink descriptor channel, in accordance with aspects of the present disclosure.

FIG. 3 shows a flow diagram 300 of wireless communications between base station 105-*a* and UE 115-*a* of wireless communications environment including an uplink descriptor channel, in accordance with aspects of the present disclosure. In some examples, the flow diagram 300 may employ aspects of wireless communications 410 or 510 over a shared radio frequency spectrum band, as described with reference to FIGS. 4 through 8.

At 305, the base station 105-*a* may identify resources of a radio frequency spectrum band. For example, the base station may identify available resources of a shared and/or a dedicated radio frequency spectrum band. In some examples, identifying available resources of a shared radio frequency spectrum band may include performing channel selection (e.g., based on long-term signal conditions and interference metrics on frequency channels of the shared radio frequency spectrum band). In some examples, the base station may follow a successful downlink CCA (DCCA) procedure by transmitting a downlink channel usage beacon signal (D-CUBS) to reserve the associated resources of the shared radio frequency spectrum band for at least a portion of a listen-before-talk (LBT) radio frame.

At 310, the base station 105-*a* may allocate available channel resources to the UE 115-*a*. In some examples, allocated resources may include uplink data channel resources of the shared radio frequency spectrum band. The uplink data channel resources may be allocated, for example, in response to a scheduling request received from the UE 115-*a* (not shown). In some examples, the allocated resources may include resources that are allocated on a periodic basis. The allocated uplink data channel resources may include granted transmission intervals (e.g., TTIs, subframes, etc.) for one or more channels of a shared radio frequency spectrum band. The base station 105-*a* may prepare an uplink grant in order to indicate the allocated uplink data channel resources to the UE 115-*a*. The uplink grant may also include indications of a configuration determined by the base station 105-*a* for uplink transmissions, such as an MCS. In some examples the base station 105-*a* may also have data buffered for downlink transmission to the UE 115-*a*. When the base station 105-*a* has downlink data buffered for the UE 115-*a*, the base station may prepare the downlink data for transmission, and include indications of how the downlink data is configured in a downlink grant (e.g., one or more parameters indicating a downlink configuration determined by the base station 105-*a*).

At 315, the base station 105-a may transmit one or more grants, which may include uplink grants, and where applicable, may also include downlink grants. In some examples the grant(s) may be transmitted over resources of a shared radio frequency spectrum band, such as downlink resources 430 described with reference to FIG. 4. In other examples, the grant(s) may be transmitted over a dedicated (e.g., licensed) radio frequency spectrum band. The transmitted grant(s) may include an uplink grant identifying uplink data channel resources identified by the base station as available for the UE (e.g., allocated to the UE), and the transmitted grant(s) may subsequently be received by the UE 115-a.

At 320, the UE 115-a may determine an uplink configuration for using the uplink data channel resources (e.g., resources identified by an uplink grant of 315) for an uplink transmission (e.g., for transmitting uplink data). For example, the UE 115-a may determine whether UCI is to be included in the uplink transmission. Additionally or alternatively, the UE may determine a number of transmission intervals for the uplink transmission, an MCS for the uplink transmission, or a number of channels for the uplink transmission. In some examples, the uplink configuration determined by the UE 115-a may be different from, and/or include further parameters than an uplink configuration determined by the base station (e.g., as indicated by a grant at 315). In some examples, the UE 115-a may configure UCI to be transmitted with a same rank as uplink data, a same PMI as uplink data, a same modulation order as uplink data, or any combination thereof.

At 325, the UE 115-a may construct an uplink descriptor channel. The uplink descriptor channel may be constructed, for example, in response to an uplink grant received from the base station 105-a at 315, and may include one or more parameters indicating the uplink configuration determined by the UE at 320. In some examples the constructed uplink descriptor channel may indicate whether UCI from the UE 115-a is present in an uplink transmission. In some cases, the uplink descriptor channel may include an indication of the format of the UCI present in the uplink transmission. In some examples, the uplink descriptor channel may include an indication that an uplink transmission has a configuration different from a configuration indicated in the uplink grant received at 315. For example, the uplink descriptor channel may include an indication that the uplink transmission from UE 115-b is being transmitted over a number of transmission intervals, over a number of frequency channels, and/or with an MCS that is different from those indicated in the uplink grant.

The UE 115-a may spread the indications of the uplink descriptor channel across one or more frequency channels. For example, the UE 115-a may spread uplink descriptor channel information and map the spread information to resources of a physical channel (e.g., predetermined PHY layer resources, etc.). In some examples the UE may configure the uplink transmission such that the uplink descriptor channel follows a DMRS, such that a single DMRS can be used for both the uplink descriptor channel and the remaining portions of the uplink transmission. In some examples, the UE 115-a may configure the uplink transmission such that the uplink descriptor channel is located at the beginning of an uplink burst. Additionally or alternatively, the UE 115-a may configure the uplink transmission such that the uplink descriptor channel is spread across one or more frequency channels by way of replication and/or distribution across the allocated uplink data channel resources. In some examples, the UE 115-a may configure the uplink descriptor channel to be transmitted with a same rank as uplink data, a same PMI as uplink data, a same modulation order as uplink data, or any combination thereof.

At 330, the UE 115-a may transmit the uplink descriptor channel and uplink data to be received by the base station 105-a in an uplink transmission, which may be a transmission using at least a portion of the uplink data channel resources identified by an uplink grant at 315. In some examples, the transmission of 330 may include transmitting the uplink descriptor channel via two or more of the allocated frequency channels. In some examples, UE 115-a may rate match UCI around the uplink descriptor channel, and/or rate match the uplink data around the uplink descriptor channel and the UCI prior to transmitting the uplink transmission. For the uplink transmission, the UE 115-a may select frequency channels from the frequency channels of the allocated uplink data channel resources indicated by the grants received from base station 105-a (e.g., at 315). In some examples the UE 115-b may then perform an uplink CCA (UCCA) procedure for each of the selected frequency channels. The transmission of the uplink descriptor channel and uplink data may then be transmitted over frequency channels associated with successful UCCA procedure(s), and in some examples the uplink descriptor channel may include an indication of those channels for which a respective UCCA was successful.

At 335, the base station 105-a may decode and/or otherwise interpret the uplink descriptor channel from the uplink transmission received at 330. The uplink descriptor channel may be decoded from a predetermined portion of the received uplink transmission, which may include a beginning portion of the uplink transmission (e.g., a beginning of an uplink burst). Further, the remaining portions of the uplink transmission may be decoded based on indications of the received uplink descriptor channel (e.g., decoding UCI based on the one or more parameters indicating the uplink configuration determined by the UE, such as an indication of the format of UCI, decoding over an indicated number of transmission intervals, decoding over an indicated number of frequency channels, decoding according to an indicated MCS, etc.).

In some examples, the base station 105-a may reallocate radio frequency spectrum resources at 340, based on indications of the uplink descriptor channel received at 330. For example, base station 105-a may reallocate a portion of the number of transmission intervals and/or number of frequency channels granted to the UE 115-a which the UE 115-a does not transmit over. The reallocation may be based on an indication of the uplink descriptor channel that the uplink transmission from UE 115-a has been transmitted over a number of transmission intervals that is different from the number of transmission intervals granted by base station 105-a, and/or an indication of the uplink descriptor channel that the uplink transmission from UE 115-a has been transmitted over a number of frequency channels that are different from the number of frequency channels granted by base station 105-a.

In some examples, the base station 105-a may determine at 345 that a downlink grant sent at 315 identifying downlink information for the UE 115-a was not received by UE 115-a. For example, if the UE 115-a does not receive a downlink grant at 315, the UE 115-a may not generate certain types of UCI (e.g., HARQ ACK/NACK information). In such examples, the UE 115-a may include only non-data associated UCI, or no UCI in the uplink transmission. Therefore, if the uplink descriptor channel received at 330 indicates that no UCI is present in the received uplink transmission, or if UCI included in the uplink transmission doesn't match an expected type of UCI, the base station 105-a may determine that the downlink grant transmitted at 315 was not received by the UE 115-b.

It should be noted that methods described with reference to the flow diagram 300 comprise possible implementations at the base station 105-a and at the UE 115-a, and that the operations may be rearranged or otherwise modified such that other implementations are possible. For example, aspects of the flow diagram 300 may include operations or aspects of the other methods, or other operations or techniques described herein. In other examples, methods of employing an uplink descriptor channel may omit one or more of the operations shown with respect to the flow diagram 300. Thus, aspects of the disclosure may describe various methods for descriptor channel design for uplink channels in a shared radio frequency spectrum band.

Figure 4:
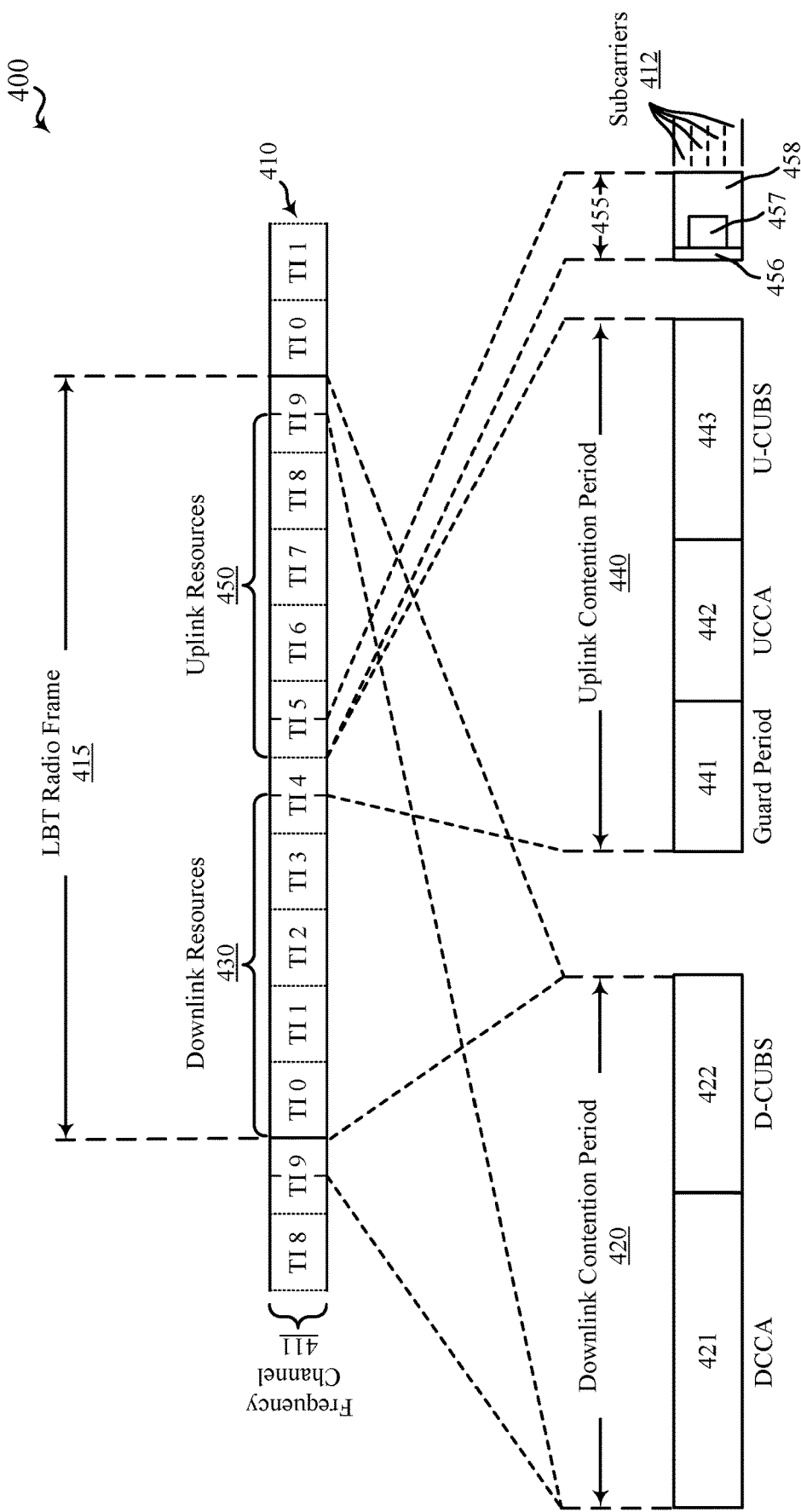
FIG. 4 shows an example diagram of employing an uplink descriptor channel in a wireless communications over a frequency channel of a shared radio frequency spectrum, in accordance with aspects of the present disclosure.

FIG. 4 shows an example diagram 400 of employing an uplink descriptor channel in a wireless communications 410 over a frequency channel 411 of a shared radio frequency spectrum, in accordance with aspects of the present disclosure. The wireless communication 410 may comprise an LBT radio frame 415, wherein the LBT radio frame 415 may be divided into a number of transmission intervals (TIs), which may be examples of TTIs, subframes, or any other suitable transmission interval. As shown in the example 400, the LBT radio frame 415 may comprise a downlink contention period 420, a downlink resource 430, an uplink contention period 440, and uplink resources 450.

As shown in the example 400, the downlink contention period 420 may include a first portion 421 for performing a DCCA procedure, which may be performed by a base station 105 to reserve, for a period of time, a channel (e.g., the frequency channel 411) of the shared radio frequency spectrum over which the wireless communication 410 occurs. If the DCCA procedure is successful, the base station 105 may transmit a D-CUBS during a second portion 422 of the downlink contention period 420 to provide an indication to other base stations or apparatuses (e.g., UEs, Wi-Fi APs/STAs, etc.) that the base station 105 has reserved the frequency channel 411. In some examples, the D-CUBS may occupy at least a certain percentage of the available frequency bandwidth of the shared radio frequency spectrum to satisfy one or more regulatory requirements. The D-CUBS may in some examples take a form similar to that of an LTE/LTE-A cell-specific reference signal (CRS) or a channel state information reference signal (CSI-RS). Following a successful DCCA procedure, the base station 105 may proceed with downlink transmissions over the shared radio frequency spectrum band using the downlink resource 430. In various examples, the downlink transmissions may include downlink data and/or control information, such as downlink grants and/or uplink grants. For example, an uplink grant transmitted over the downlink resources 430 may include an indication to a UE 115 that uplink resources (e.g., uplink resources 450) have been allocated to the UE 115. If the DCCA procedure fails, the base station 105 may perform a back-off (e.g., for a predetermined time, until a subsequent LBT Radio Frame 415, etc.) or switch to a different channel.

As shown in the example 400, the uplink contention period 440 may include a first portion 441 reserved as a guard period, which may facilitate a transition between downlink transmissions and uplink transmissions (e.g., accounting for signal propagation delays between a base station 105 and various UEs 115 served by the base station 105). The uplink contention period 440 may include a second portion 442 for performing a UCCA procedure, which may be performed by a UE 115 to reserve, for a period of time, a channel (e.g., the frequency channel 411) of the shared radio frequency spectrum over which the wireless communication 410 occurs. The uplink contention period 440 may be part of a special transmission interval (e.g., TI 4) that includes some portion of downlink resources 430.

If the UCCA procedure is successful, the UE 115 may transmit a U-CUBS during a third portion 443 of the uplink contention period 440 to provide an indication to other base stations or apparatuses (e.g., UEs, Wi-Fi APs/STAs, etc.) that the UE 115 has reserved the frequency channel 411. In some examples, the U-CUBS may occupy at least a certain percentage of the available frequency bandwidth of the shared radio frequency spectrum to satisfy one or more regulatory requirements. The U-CUBS may in some examples take a form similar to that of an LTE/LTE-A CRS or a CSI-RS. Following a successful UCCA procedure, the UE 115 may proceed with uplink transmissions over the shared radio frequency spectrum band using the uplink resources 450, which in some cases may be called an uplink burst.

In some examples, the DCCA procedure or the UCCA procedure may include the performance of a single CCA procedure. In other examples, the DCCA procedure or the UCCA procedure may include the performance of an extended CCA (ECCA) procedure. The ECCA procedure may include a random number of CCA procedures, and in some examples may include a plurality of CCA procedures. The terms DCCA procedure and UCCA procedure therefore include the performance of either a single CCA procedure or an ECCA procedure. The selection of a single CCA procedure or an ECCA procedure, for performance by a base station or a UE during an LBT radio frame, may be based on LBT rules. In some cases, the term CCA procedure may be used in this disclosure, in a general sense, to refer to either a single CCA procedure or an ECCA procedure.

According to aspects of the present disclosure, a UE 115 may employ allocated uplink data channel resources (e.g., uplink resources 450) for transmitting an uplink descriptor channel. As shown in example 400, the uplink resources 450 may be configured to include a control portion 455, which in some examples may be located at the beginning of an uplink burst (e.g., following a successful UCCA procedure). The control portion 455 may include an uplink descriptor channel 457 including one or more parameters indicating an uplink configuration determined by the UE 115, which may provide, for example, an indication that uplink transmissions (e.g., transmissions over the uplink resources 450) include UCI, and/or that uplink transmissions have a configuration different from a configuration indicated by an uplink grant received from a base station 105 (e.g., employing a different number of transmission intervals, a different number of frequency channels, and/or a different MCS).

The uplink descriptor channel 457 may be a predetermined portion of the uplink resources 450, such as one or more predetermined subcarriers 412 of the frequency channel 411 for one or more predetermined time intervals. For example, as shown in the wireless communications 410, the control portion 455 of the uplink resources 450 may include a DMRS 456, which is used for transmitting a DMRS from the UE 115. In some examples, the uplink descriptor channel 457 may be located after the DMRS 456, such that a single DMRS may be configured for synchronizing both the uplink descriptor channel 457 and other portions of uplink transmissions over the uplink resources 450. In other examples, DMRS 456 may be included in a transmission during an uplink contention period (e.g., during the third portion 443 of the uplink contention period 440), in which case the control portion 455 of the uplink resources may not include a DMRS 456. In such examples, an uplink descriptor channel 457 may be located at the beginning of a control portion 455 of uplink resources 450.

Although the uplink descriptor channel 457 is shown as a contiguous resource portion in the frequency domain (e.g., adjacent subcarriers 412) and in the time domain, an uplink descriptor channel may be otherwise spread across the frequency channel 411 of the wireless communications 410. For example, an uplink descriptor channel may be spread across resources blocks having non-contiguous subcarriers and/or non-continuous time resources. Furthermore, although shown at the beginning of the uplink resources 450, an uplink descriptor channel 457 may be spread across any arrangement of resources of the uplink resources 450. For example, some portion of data may be transmitted before the DMRS 456, while the uplink descriptor channel 457 follows the DMRS 456.

As shown in the wireless communications 410, the control portion 455 of the uplink resources 450 may be configured to include a UCI portion 458, including UCI to be transmitted from the UE 115 to the base station 105. Although the UCI portion 458 is shown as included in the control portion 455, a UCI portion 458 may also be spread across any arrangement of resources of the uplink resources 450.

In various examples, the uplink descriptor channel 457 and/or UCI portion 458 may be configured to have the same rank, PMI, and/or modulation order as uplink data transmitted over the uplink resources 450. This may, for example, facilitate the transmission and decoding of the uplink descriptor channel 457 and/or UCI portion 458 by allowing demodulation using the same DMRS as the uplink data. Alternatively, where the uplink data is transmitted using rank 2 or above, spatial frequency block coding (SFBC) may be used to map the uplink descriptor channel 457 and/or UCI portion 458 across spatial layers. In other examples using rank 2 or above, the uplink descriptor channel 457 and/or UCI portion 458 may be mapped to the first spatial layer only, and may be demodulated using the DMRS associated with the first spatial layer.

By way of example, the transmission intervals of the LBT radio frame 415 may include a subframe structure according to known communications protocols (e.g., LTE, LTE-A, etc.). In such examples, the LBT radio frame 415 may be described as having a DDDDSUUUUS' TDD frame structure. In other examples, an LBT radio frame may have a different TDD frame structure. For example, an LBT radio frame may have one of the TDD frame structures used in enhanced interference mitigation and traffic adaptation (eIMTA). In other examples, the LBT radio frame 415 may have a more dynamically determined TDD frame structure.

Figure 5:
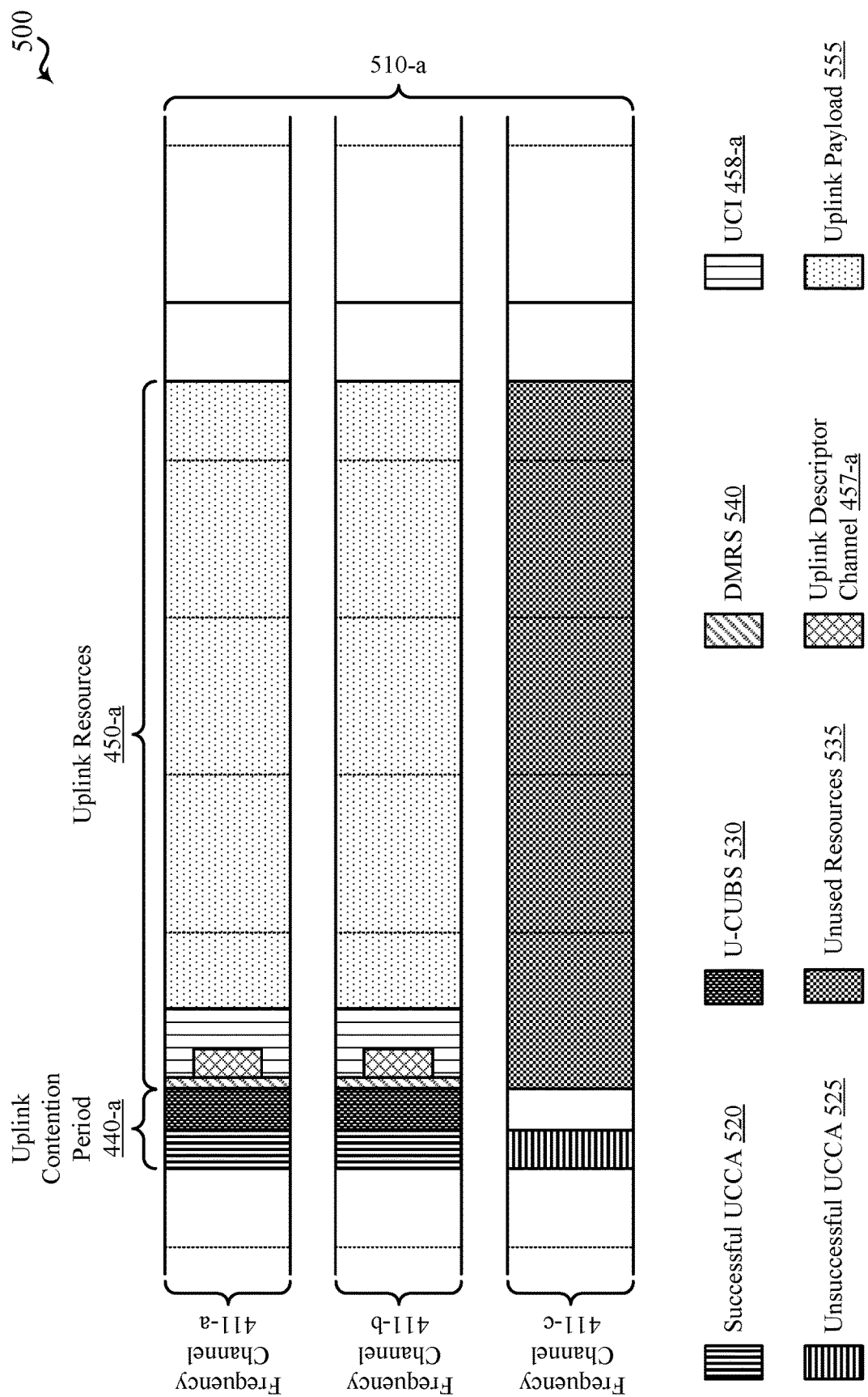
FIG. 5 shows an example diagram of employing an uplink descriptor channel in a wireless communication over multiple frequency channels of a shared radio frequency spectrum, in accordance with aspects of the present disclosure.

FIG. 5 shows an example diagram 500 of employing an uplink descriptor channel in a wireless communication 510-a over multiple frequency channels of a shared radio frequency spectrum, in accordance with aspects of the present disclosure. Wireless communication 510-a may share various aspects of wireless communications 410 described with reference to FIG. 4, including an uplink contention period 440-a and uplink resources 450-a, which may be examples of the corresponding features described with reference to FIG. 4. Wireless communication 510-a, however, includes uplink resources 450-a that have been allocated to a UE 115 over multiple frequency channels. Specifically, a base station 105 may allocate uplink resources 450-a over each of the frequency channels 411-a, 411-b, and frequency channel 411-c.

In example 500, the UE 115 may receive an uplink grant indicating the allocation of uplink resources 450-a. The uplink grant may be transmitted by a base station 105 using, for example, downlink resources 430 as described with reference to FIG. 4, which may be transmitted over one or more of the frequency channels 411-a, 411-b, or 411-c. In other examples the uplink grant may be transmitted via any other frequency channel, which may be part of the shared radio frequency spectrum band or a dedicated radio frequency spectrum band.

Following the receipt of an uplink grant indicating the allocation of the uplink resources 450-a, the UE 115 may perform a UCCA to contend for access on each of the frequency channels 411-a, 411-b, and 411-c. In some examples, the UCCA procedure may be performed in a special transmission interval as described with reference to FIG. 4. Success of the UCCA procedures may be channel dependent. As shown in example diagram 500, frequency channels 411-a and 411-b may have successful UCCA procedures 520, and frequency channel 411-c may have an unsuccessful UCCA procedure 525. As shown in wireless communications 510-a, the UE 115 may subsequently transmit a U-CUBS 530 on those channels with a successful UCCA procedures 520 to reserve the frequency channels of the shared radio frequency spectrum band, and may not transmit a U-CUBS 530 on the frequency channels associated with the unsuccessful UCCA procedure 525. Thus, despite the UE 115 being allocated uplink data channel resources over three frequency channels 411, the UE 115 may recognize the unsuccessful UCCA procedure 525, and not employ the third frequency channel 411-c in a subsequent uplink transmission. As a result of the unsuccessful UCCA procedure 525, at least a portion of uplink resources 450-a of the frequency channel 411-c, may be unused resources 535 (e.g., after the channel subsequently becomes clear).

The UE 115 may determine uplink descriptor information (e.g., one or more parameters indicating an uplink configuration) for wireless communications 510-a and spread the uplink descriptor information over uplink descriptor channels 457-a on both the first frequency channel 411-a and the second frequency channel 411-b. Each of the uplink descriptor channels 457-a may include all (e.g., replication) or a subset of the uplink descriptor information. For example, the uplink descriptor information may be redundancy coded and spread across the multiple uplink descriptor channels 457-a. In some examples, a receiving base station 105 may be able to determine the uplink descriptor information for all frequency channels of wireless communications 510-a even when receiving only one of the uplink descriptor channels 457-a (e.g., the redundancy coding may be greater than or equal to the number of frequency channels 411 used for the wireless communication 510-a). Wireless communications 510-a may also include UCI portions 458-a spread over each of the frequency channels 411, and UCI may be similarly spread (e.g., coded and/or distributed, replicated, etc.) across frequency channels 411. The remaining portions of the uplink resources 450-a may be allocated to uplink payload 555, which may be used for other uplink data and/or control information.

Figure 6:
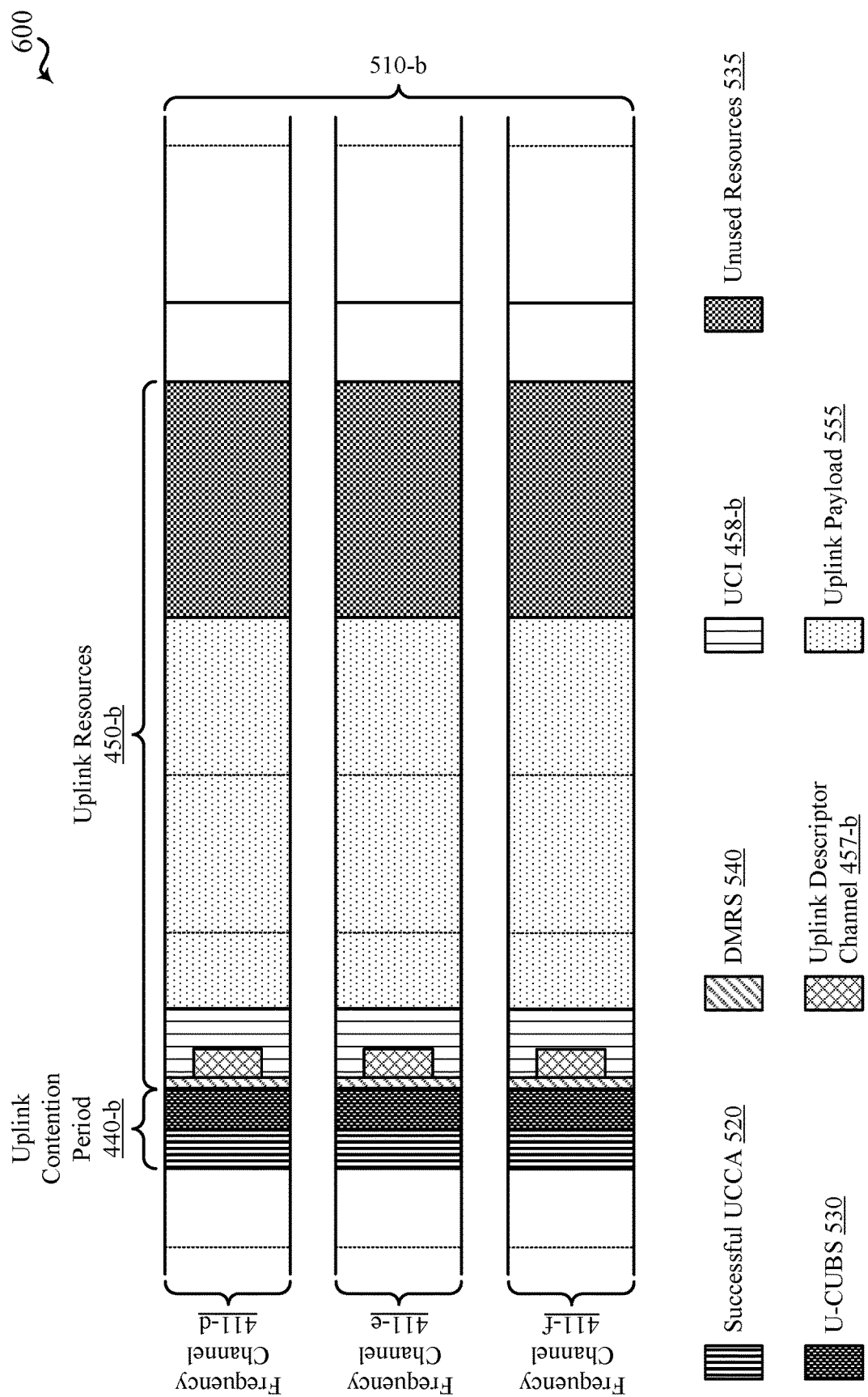
FIG. 6 shows an example diagram of a wireless communication over a shared radio frequency spectrum where a change in a number of transmission intervals employed in an uplink transmission may be indicated by an uplink descriptor channel, in accordance with aspects of the present disclosure.

FIG. 6 shows an example diagram 600 of employing an uplink descriptor channel in a wireless communication 510-b over multiple frequency channels of a shared radio frequency spectrum, in accordance with aspects of the present disclosure. Wireless communication 510-b may share various aspects of wireless communications 410 described with reference to FIG. 4, including an uplink contention period 440-b and uplink resources 450-b, which may be examples of the corresponding features described with reference to FIG. 4. Wireless communication 510-b, however, includes uplink resources 450-b that have been allocated to a UE 115 over multiple frequency channels. Specifically, a base station 105 may allocate uplink resources 450-b over each of the frequency channels 411-d, 411-e, and 411-f, similarly to the allocation described with reference to FIG. 5.

Following the receipt of an uplink grant indicating the allocation of the uplink resources 450-b, the UE 115 may perform a UCCA to contend for access on each of the frequency channels 411-d, 411-e, and 411-f. As shown in example 600, frequency channels 411-d, 411-e, and 411-f may each have successful UCCA procedures 520, and the UE 115 may subsequently transmit a U-CUBS 530 to reserve each of the frequency channels 411.

In example diagram 600, the UE 115 may have less uplink data to transmit than would fill the allocated uplink resources 450-b according to, for example, an MCS indicated in the associated uplink grant. Thus, in example 600 the UE 115 may adjust the length of the uplink transmission to be shorter than the granted uplink resources 450-b (e.g., determining an uplink configuration different from an uplink configuration of the associated uplink grant). The UE 115 may indicate, for example, the uplink grant adjustment to the base station 105 by including the indication in the uplink descriptor channel 457-b, which may be spread across each of the frequency channels 411 by way of replication and/or distribution as discussed above. The uplink grant adjustment may include, for example, a number of transmission intervals of the uplink transmission or an indication of a difference between the number of transmission intervals used for the uplink transmission and the granted uplink resources 450-b. For example, the indication of the difference may be a number of transmission intervals (e.g., with a predetermined granularity, etc.) or a fraction of the granted uplink resources 450-b used.

Wireless communications 510-b may also include UCI portions 458-b spread over each of the frequency channels 411, and UCI may be similarly replicated and/or distributed across frequency channels 411. The remaining portions of the uplink resources 450-b used for the uplink transmission may be allocated to uplink payload 555, which may be used for other uplink data and/or control information. Similarly to wireless communications 510-a, the uplink descriptor channels 457-b of wireless communications 510-b may be transmitted after a DMRS, such as DMRS 540 of each of the frequency channels 411-d, 411-e, and 411-f.

In some examples, the base station 105 may receive the uplink descriptor channels 457-b from the UE 115, and decode the indication of uplink grant adjustment. The base station may then reallocate the unused resources 535 for subsequent transmissions. For example, the base station may initiate a new LBT radio frame 415 for the respective frequency channels 411 (e.g., in an asynchronous communications mode), which may be communicated to UEs 115 served by the base station 105 in any customary manner.

Figure 7:
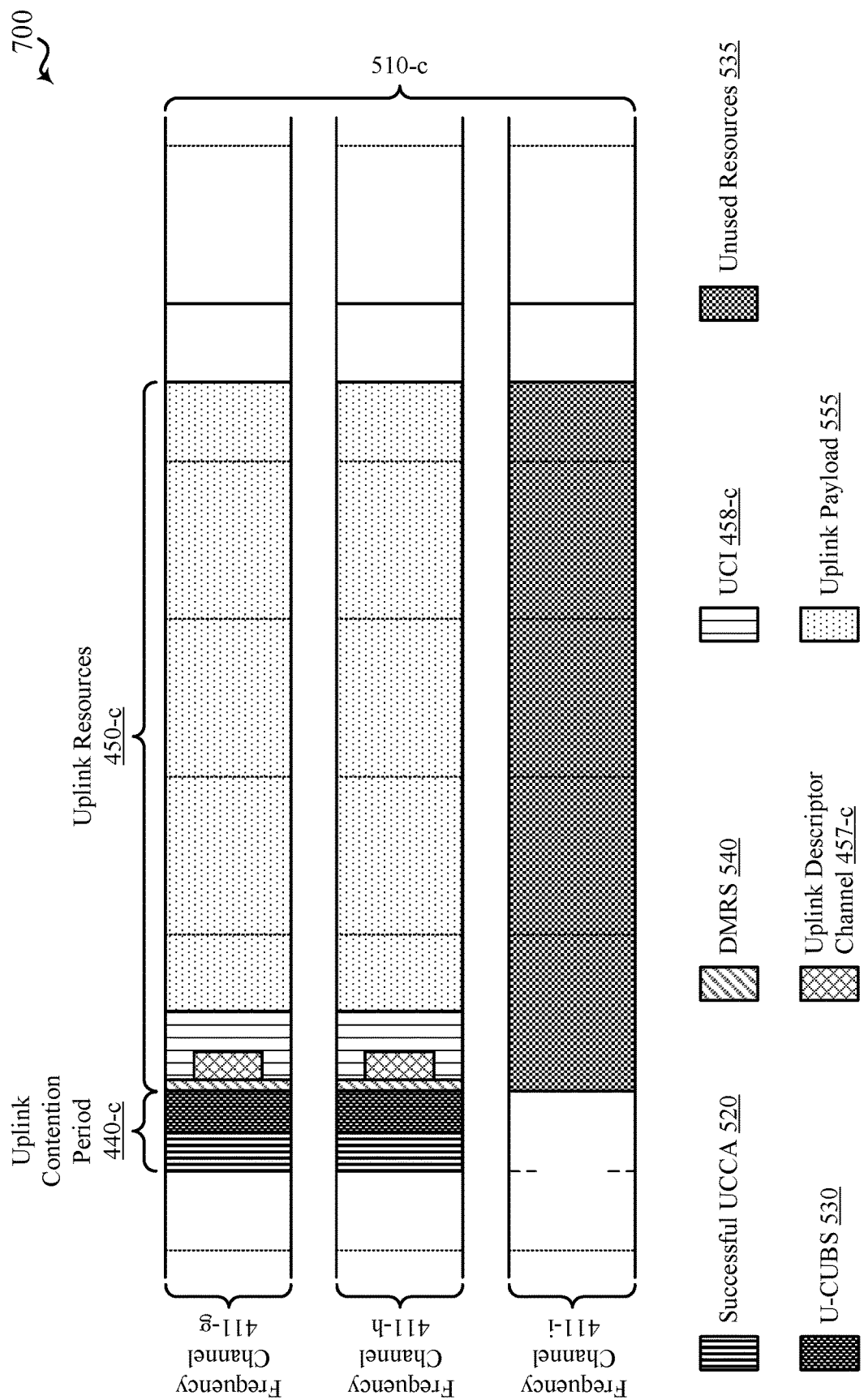
FIG. 7 shows an example diagram of a wireless communication over a shared radio frequency spectrum where a change in a number of frequency channels employed in an uplink transmission may be indicated by an uplink descriptor channel, in accordance with aspects of the present disclosure.

FIG. 7 shows an example diagram 700 of employing an uplink descriptor channel in a wireless communication 510-c over multiple frequency channels of a shared radio frequency spectrum, in accordance with aspects of the present disclosure. Wireless communication 510-c may share various aspects of wireless communications 410 described with reference to FIG. 4, including an uplink contention period 440-c and uplink resources 450-c, which may be examples of the corresponding features described with reference to FIG. 4. Wireless communication 510-c, however, includes uplink resources 450-c that have been allocated to a UE 115 over multiple frequency channels. Specifically, a base station 105 may allocate uplink resources 450-c over each of the frequency channels 411-g, 411-h, and 411-i, similarly to the allocation described with reference to FIG. 5.

In example diagram 700, the UE 115 may have less uplink data to transmit than would fill the allocated uplink resources 450-c across each of the frequency channels 411-g, 411-h, and 411-i according to, for example, an MCS indicated in the associated uplink grant. As illustrated in example 700 the UE 115 may and employ a subset of the allocated frequency channels (e.g., frequency channels 411-g and 411-h) for an uplink transmission (e.g., determining an uplink configuration that uses fewer frequency channels than a number of frequency channels of the associated uplink grant). The UE 115 may indicate, for example, channel usage information in the uplink descriptor channels 457-c, which may be spread across the frequency channels 411-g and 411-h by way of replication and/or distribution.

As discussed above, the UE 115 may perform UCCA for frequency channels 411-g and 411-h and transmit U-CUBS 530 and DMRS 540 after successful UCCA procedures 520. Wireless communications 510-b may also include UCI portions 458-c spread over frequency channels 411-g and 411-h, and UCI may be similarly replicated and/or distributed across those frequency channels. The remaining portions of the uplink resources 450-c used for the uplink transmission may be allocated to uplink payload 555, which may be used for other uplink data and/or control information.

In some examples, the base station 105 may receive the uplink descriptor channels 457-c from the UE 115, and decode the indication of unused resources 535 of the frequency channel 411-i. The base station may then reallocate the unused resources 535 for subsequent transmissions. For example, the base station may perform a DCCA procedure on frequency channels 411-i in order to contend for access to the frequency channels of the shared radio frequency spectrum band. In some examples, performing a DCCA during the unused resources 535 may initiate a new LBT radio frame 415 for frequency channel 411-i (e.g., in an asynchronous communications mode), which may be communicated to UEs 115 served by the base station 105 in any customary manner.

Figure 8:
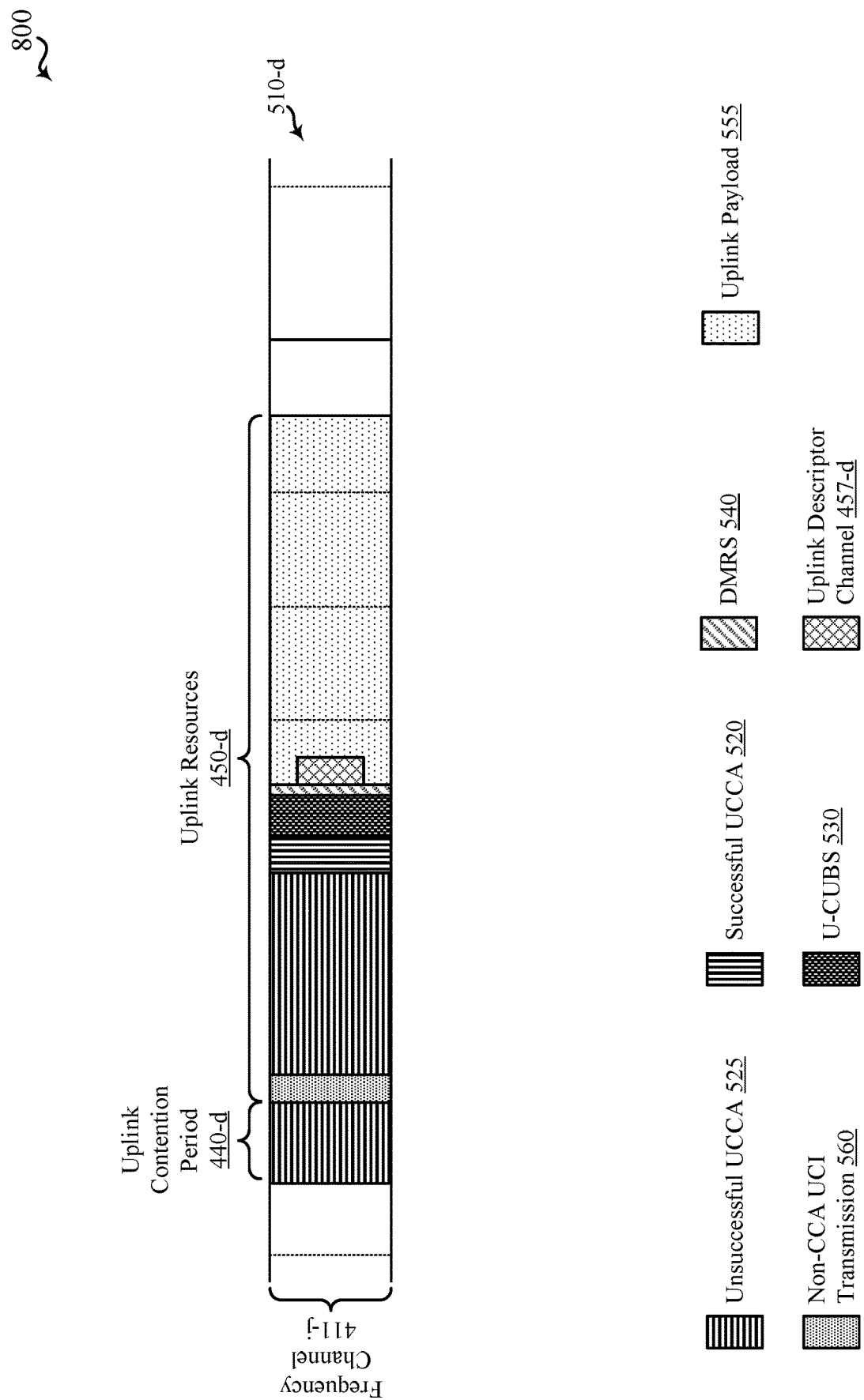
FIG. 8 shows an example diagram of a wireless communication over a shared radio frequency spectrum where an uplink descriptor channel may be modified in response to a failed CCA, in accordance with aspects of the present disclosure.

FIG. 8 shows an example diagram 800 of a wireless communication 510-d over a shared radio frequency spectrum where an uplink descriptor channel may be modified in response to a failed CCA, in accordance with aspects of the present disclosure. Wireless communication 510-d may share various aspects of wireless communications 410 described with reference to FIG. 4, including an uplink contention period 440-d and uplink resources 450-d, which may be examples of the corresponding features described with reference to FIG. 4. A base station 105 may allocate the uplink resources 450-d over the frequency channels 411-j similarly to the allocation described with reference to FIG. 5.

As shown example diagram 800, the UE 115 may have an unsuccessful contention for the uplink resources 450-d of the frequency channel 411-j for a time period (e.g., unsuccessful UCCA procedure 525 during the uplink contention period 440-d). In response to the unsuccessful contention, the UE 115 may refrain from transmitting over the allocated uplink data channel resources. However, the UE 115 may have UCI information to send and may be allocated resources for transmitting UCI information using a non-CCA UCI transmission 560. The non-CCA UCI transmission 560 may be permitted in a shared radio frequency spectrum band, but the transmissions may be prone to interference because the resources may be in use by another nearby device. The UE 115 may continue to attempt to contend for access to the frequency channel 411-j after the non-CCA UCI transmission 560, and may have an additional period of unsuccessful UCCA procedure 525 during the uplink resources 450-d before having a successful UCCA procedure 520 during the uplink resources 450-d. After the successful UCCA procedure 520, the UE 115 may proceed with the transmission of an uplink descriptor channel 457-d as previously described. However, because UCI was transmitted in the non-CCA UCI transmission 560, the uplink descriptor channel 457-d may include an indication that UCI is not present in the uplink transmission following the successful UCCA procedure 520. Thus, the uplink transmission of wireless communications 510-d following the successful UCCA may only include the uplink descriptor channel 457-d and uplink payload 555, which in some examples may follow the DMRS 540. In such examples, the uplink payload 555 may be rate-matched around the uplink descriptor channel 457-d.

Although the described transmission of UCI employs non-CCA UCI transmission 560 in the shared radio frequency spectrum, in other examples UCI may be transmitted over otherwise allocated radio frequency spectrum resources, such as resources of a dedicated radio frequency spectrum band.

Figure 9:
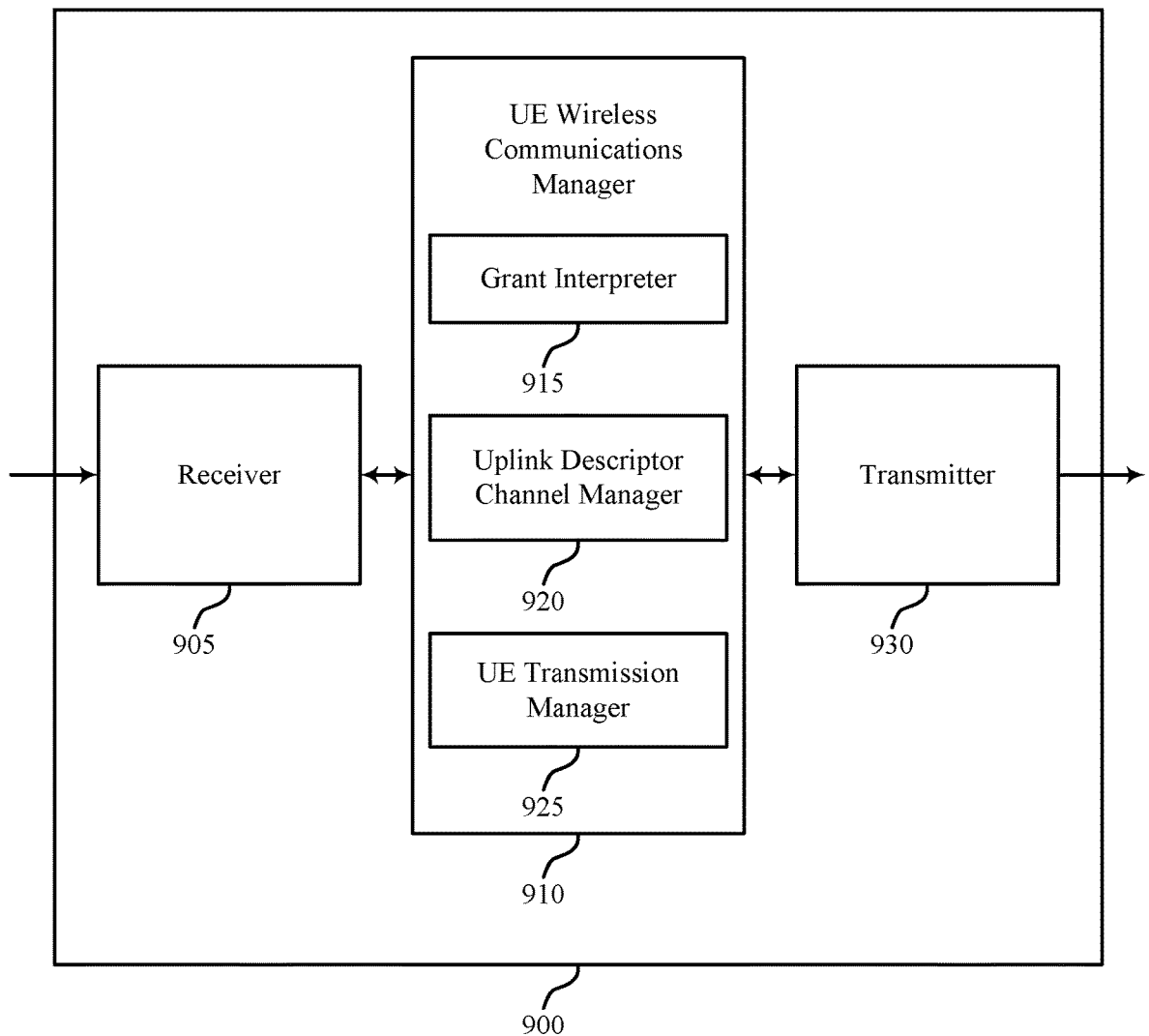
FIG. 9 shows a block diagram of an apparatus for use in wireless communication, configured for employing an uplink descriptor channel, in accordance with aspects of the present disclosure.

FIG. 9 shows a block diagram of an apparatus 900 for use in wireless communication, configured for employing an uplink descriptor channel, in accordance with aspects of the present disclosure. Apparatus 900 may be an example of aspects of a UE 115 as described with reference to FIGS. 1, 2, 3, and 11. Apparatus 900 may include a receiver 905, a UE wireless communications manager 910 and a transmitter 930. Each of these components may be in communication with each other.

The receiver 905 may receive information such as packets, user data, or control information associated with various information channels (e.g., control channels, data channels, information related to implementing an uplink descriptor channel, etc.). For example, the receiver may receive uplink and/or downlink grants from a base station 105. Information may be passed on to other components of the device. The receiver 905 may be an example of aspects of the UE transceiver(s) 1130 and/or UE antenna(s) 1140 described with reference to FIG. 11.

The UE wireless communications manager 910 may manage various aspects of wireless communications at the apparatus 900. For example, the UE wireless communications manager 910 may include a grant interpreter 915, an uplink descriptor channel manager 920, and a UE transmission manager 925.

The grant interpreter 915 may be configured to interpret grants (e.g., uplink and/or downlink grants) received from a base station 105 by the receiver 905. For example, the grant interpreter 915 may decode an uplink grant identifying uplink data channel resources identified by the base station 105 as available for the UE, the identified uplink data channel resources including one or more granted transmission intervals for one or more channels of a shared radio frequency spectrum band. In some examples, the grant interpreter may decode parameters of an uplink configuration determined by the base station 105 as indicated in the received uplink grant, such as a granted number of transmission intervals, a granted number of frequency channels, and/or a granted MCS. The grant interpreter 915 may provide the decoded configuration parameters to various elements of the UE wireless communications manager 910, including the uplink descriptor channel manager 920 and/or the UE transmission manager 925.

The uplink descriptor channel manager 920 may be configured to manage aspects of an uplink descriptor channel as described herein. For example, the uplink descriptor channel manager 920 may determine uplink descriptor information to indicate how granted uplink data channel resources are used by the apparatus 900 (e.g., one or more parameters indicating an uplink configuration determined by the apparatus 900). The indications may include, for example, an indication of whether UCI is present in an uplink transmission, and when UCI is present, the indications may include an indication of the format of the UCI. Additionally or alternatively, the uplink descriptor channel manager 920 may determine uplink descriptor information to indicate that the allocated uplink data channel resources are used with an uplink configuration that is different from a configuration indicated by an uplink grant (e.g., as decoded by the grant interpreter 915). For example, the uplink descriptor information may include an indication that an uplink transmission employs a number of transmission intervals, a number of frequency channels, and/or an MCS that is different from those decoded by the grant interpreter 915.

The UE transmission manager 925 may be configured to manage aspects of uplink transmissions from the apparatus 900. For example, the UE transmission manager 925 may assign information to be delivered via an uplink transmission to various portions of allocated resources of a shared radio frequency spectrum band (e.g., frequency channels, subcarriers, transmission intervals, etc.). In some examples the UE transmission manager 925 may multiplex uplink descriptor information received from the uplink descriptor channel manager 920 with UCI and uplink data into physical channels for transmission over the allocated uplink data channel resources. In some examples the UE transmission manager 925 may determine an uplink configuration for using identified uplink data channel resources for an uplink transmission, which may include configuring the uplink transmission in a manner different from an uplink configuration indicated by an uplink grant (e.g., as decoded by the grant interpreter 915). For example, the UE transmission manager 925 may configure the uplink transmission to employ a different number of transmission intervals, a different number of frequency channels, and/or a different MCS. In some examples the UE transmission manager 925 may configure the uplink transmission to further include UCI with the uplink data and the uplink descriptor channel. The UE transmission manager 925 may send the information to the transmitter 930 to be sent via an uplink transmission.

The transmitter 930 may transmit signals received from other components of the apparatus 900. For example, the transmitter 930 may be configured to transmit uplink transmissions to a base station 105 serving the apparatus 900, which may include the uplink data and the uplink descriptor channel, as received from the UE transmission manager 925. In some examples, the transmitter 930 may be collocated with a receiver in a transceiver module. For example, the transmitter 930 may be an example of aspects of the UE transceiver(s) 1130 and/or antenna(s) 1140 described with reference to FIG. 11.

Figure 10:
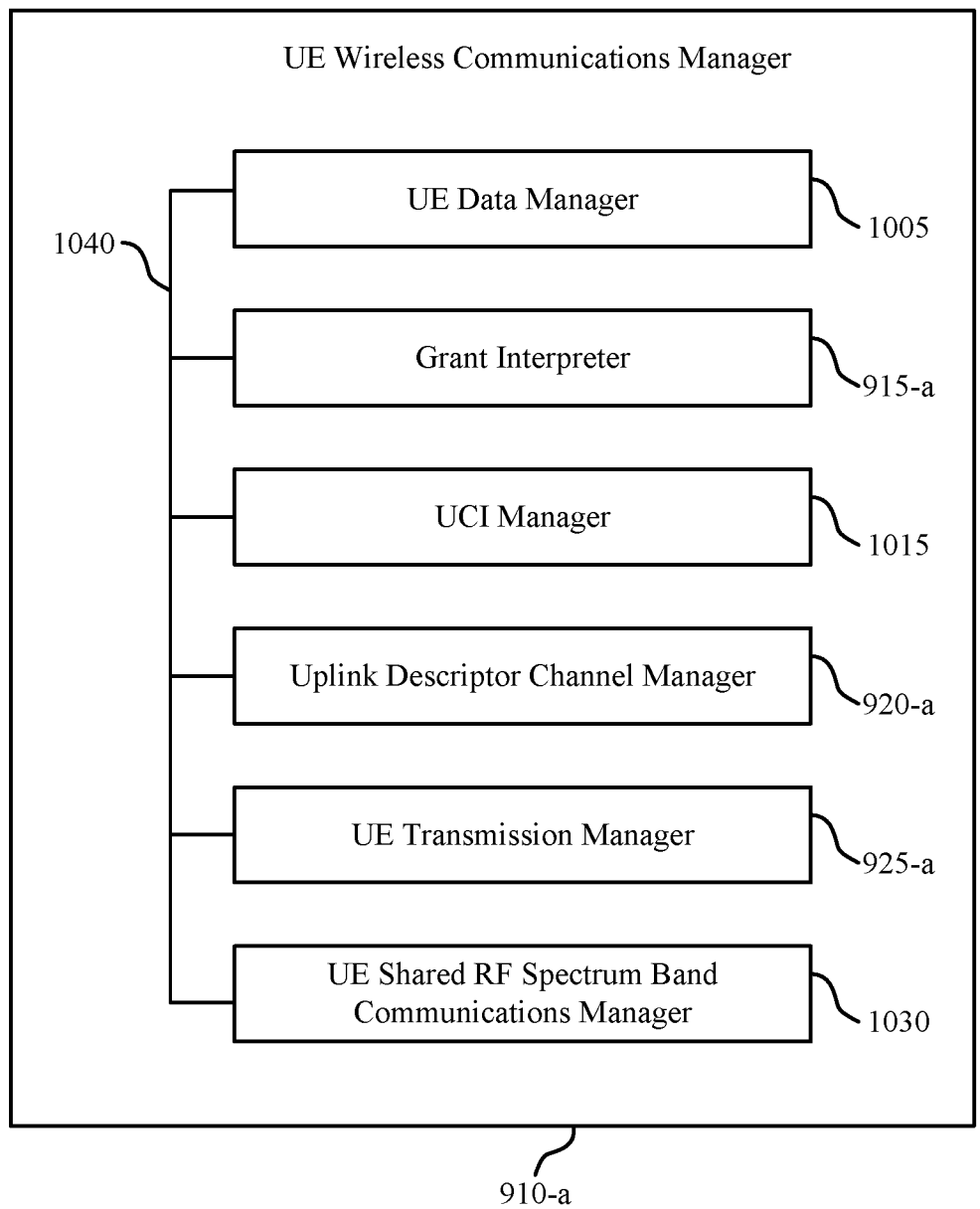
FIG. 10 shows a block diagram of a UE wireless communications manager configured for employing an uplink descriptor channel, in accordance with aspects of the present disclosure.

FIG. 10 shows a block diagram of a UE wireless communications manager 910-a configured for employing an uplink descriptor channel, in accordance with aspects of the present disclosure. The UE wireless communications manager 910-*a* may be an example of aspects of UE wireless communications manager 910 described with reference to FIG. 9. The UE wireless communications manager 910-*a* may also be an example of aspects of the UE wireless communications manager 910-*b* described with reference to FIG. 11. The UE wireless communications manager 910-*a* may include a UE data manager 1005, a grant interpreter 915-*a*, a UCI manager 1015, an uplink descriptor channel manager 920-*a*, a UE transmission manager 925-*a*, and a UE shared radio frequency spectrum band communications manager 1030. Each of these modules may communicate, directly or indirectly, with one another (e.g., via bus 1040).

The UE data manager 1005 may be configured to manage aspects of uplink and downlink data for a UE 115 comprising the UE wireless communications manager 910-*a*. For example, the UE data manager 1005 may identify uplink data buffered for the UE 115, and provide an indication to the UCI manager 1015 to prepare a scheduling request for uplink transmissions. The UE data manager 1005 may also provide uplink data to the UE transmission manager 925-*a* to be prepared for uplink transmission. In some examples, upon receiving a downlink grant, the UE data manager 1005 may decode downlink data from a downlink transmission, and either provide an indication that HARQ ACK/NACK should be prepared by the UCI manager 1015, or send HARQ ACK/NACK information bits to the UCI manager 1015.

The grant interpreter 915-*a* may be an example of the grant interpreter 915 described with reference to FIG. 9, and may be configured to interpret grants (e.g., uplink and/or downlink grants) received from a base station 105 by a receiver 905 as discussed above. In some examples the grant interpreter 915-*a* may decode a downlink grant from a downlink transmission, and provide an indication to the UE data manager 805 regarding a configuration of downlink data to be decoded. The grant interpreter 715-*a* may provide the decoded configuration parameters to various elements of the UE wireless communications manager 910-*a*, including the UE data manager 1005, the uplink descriptor channel manager 920-*a* and/or the UE transmission manager 925-*a*.

The UCI manager 1015 may manage aspects of UCI to be provided to a base station 105 by a UE 115 comprising the UE wireless communications manager 910-*a*. For example, the UCI manager 1015 may prepare aspects of a HARQ ACK/NACK, CQI, MIMO feedback (RI, PMI, etc.), scheduling requests for uplink transmissions, binary phase shift keying (BPSK) or quadrature phase shift keying (QPSK) used for modulation, and the like. The UCI manager 1015 may send the prepared UCI to the UE transmission manager 925-*a* to be included in an uplink transmission.

The uplink descriptor channel manager 920-*a* may be an example of the uplink descriptor channel manager 920 described with reference to FIG. 9, and may be configured to determine uplink descriptor information as discussed above.

The UE transmission manager 925-*a* may be an example of the UE transmission manager 925 described with reference to FIG. 9, and may be configured to manage aspects of uplink transmissions from a UE 115 comprising the UE wireless communications manager 910-*a* as discussed above (e.g., determining an uplink configuration for using identified uplink data channel resources for an uplink transmission). In some examples the UE transmission manager 925-*a* may configure the uplink transmission to include UCI with the uplink data and the uplink descriptor channel. The UE transmission manager 925-*a* may also perform rate matching functions for information sent via uplink data channel resources. For example, the UE transmission manager 925-*a* may rate match UCI around an uplink descriptor channel, and/or rate match uplink data around an uplink descriptor channel and UCI included in an uplink transmission. In some examples the UE transmission manager 925-*a* may assign information to predetermined portions of uplink resources. For example, the UE transmission manager 925-*a* may assign the uplink descriptor channel to predetermined portion(s) of allocated uplink data channel resources, which in some examples may be at the beginning of an uplink burst, and may or may not be resources contiguous in a time and/or frequency domain (e.g., non-contiguous resource blocks). Additionally or alternatively, the UE transmission manager 925-*a* may spread an uplink descriptor channel across one or more frequency channels, by way of distribution and/or replication as described with reference to FIGS. 5 through 7. The UE transmission manager 925-*a* may send the information to a transmitter 930 of a UE comprising the UE wireless communications manager 910-*a* to be sent via an uplink transmission.

The UE shared radio frequency spectrum band communications manager 1030 may manage aspects of transmitting an uplink transmission over a shared radio frequency resource. For example, the UE shared radio frequency spectrum band communications manager 1030 may manage aspects of performing a CCA, and/or an eCCA prior to a UE 115 comprising the UE wireless communications manager 710-*a* transmitting an uplink transmission via allocated data channel resources of a shared radio frequency spectrum. In some examples the UE shared radio frequency spectrum band communications manager 1030 may configure the UE transmission manager 925-*a* such that uplink transmissions by the UE 115 employ only those channels that are associated with a successful CCA (e.g., only those uplink data channel resources of a frequency channel following a successful UCCA procedure on that frequency channel).

The components of the apparatus 900, and the UE wireless communications managers 910 described with reference to FIGS. 9 and 10, may, individually or collectively, be implemented with at least one application-specific integrated circuit (ASIC) adapted to perform some or all of the applicable features in hardware. Alternatively, the features may be performed by one or more other processing units (or cores), on at least one integrated circuit (IC). In other examples, other types of integrated circuits may be used (e.g., Structured/Platform ASICs, a field-programmable gate array (FPGA), or another semi-custom IC), which may be programmed in any manner known in the art. The features may also be implemented, in whole or in part, with instructions embodied in a memory, formatted to be executed by one or more general or application-specific processors.

Figure 11:
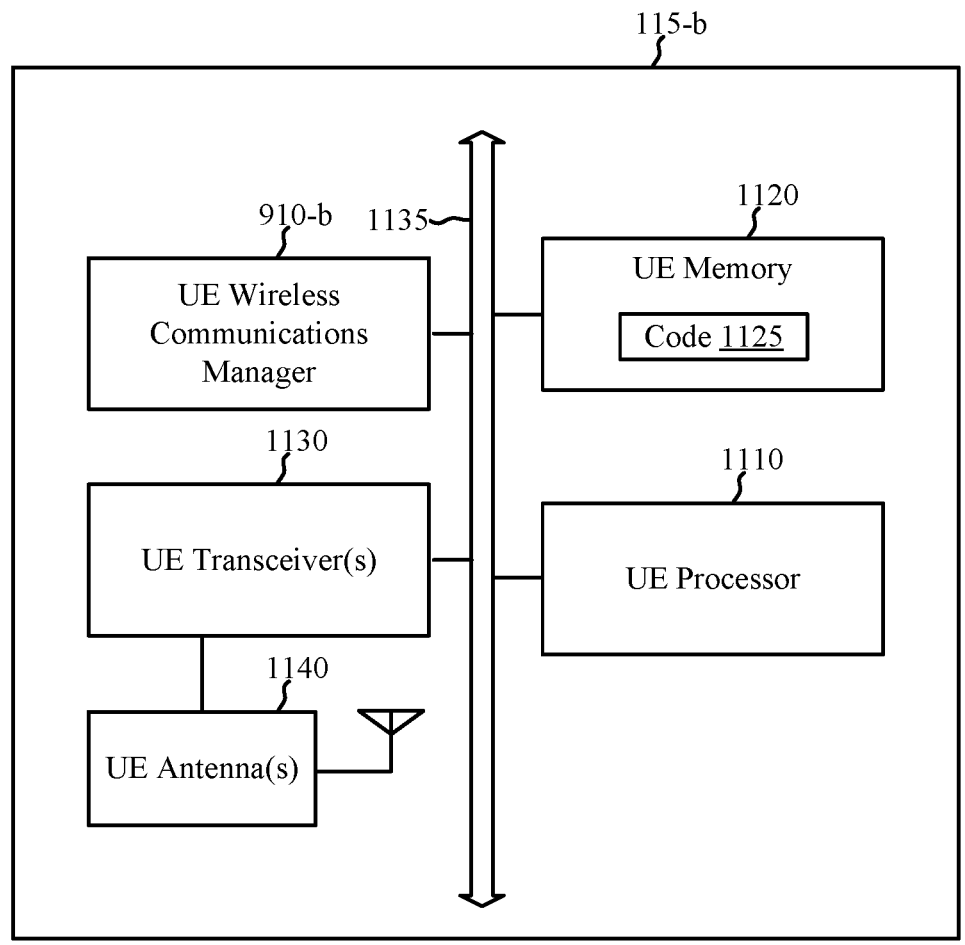
FIG. 11 shows a block diagram of a UE for use in wireless communication, configured for employing an uplink descriptor channel, in accordance with aspects of the present disclosure.

FIG. 11 shows a block diagram 1100 of a UE 115-*b* for use in wireless communication, configured for employing an uplink descriptor channel, in accordance with aspects of the present disclosure. The UE 115-*b* may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc.) The UE 115-*b* may, in some examples, have an internal power supply (not shown), such as a battery, to facilitate mobile operation. In some examples, the UE 115-*b* may be an example of aspects of one or more of the UEs 115 described with reference to FIG. 1, 2 or 3, or aspects of the apparatuses 900 or 1000 described with reference to FIG. 9 or 10. The UE 115-*b* may be configured to implement at least some of the UE or apparatus features and functions described with reference to FIGS. 1 through 10.

The UE 115-*b* may include a UE processor 1110, a UE memory 1120, at least one UE transceiver (represented by UE transceiver(s) 1130), at least one UE antenna (represented by UE antenna(s) 1140), and a UE wireless communications manager 910-*b*. Each of these components may be in communication with each other, directly or indirectly, over one or more buses 1135.

The UE memory 1120 may include random access memory (RAM) and/or read-only memory (ROM). The UE memory 1120 may store computer-readable, computer-executable software/firmware code 1125 containing instructions that are configured to, when executed, cause the UE processor 1105 to perform various functions described herein (e.g., aspects of implementing an uplink descriptor channel, etc.). Alternatively, the computer-readable, computer-executable software/firmware code 1125 may not be directly executable by the UE processor 1110, but may be configured to cause a computer (e.g., when compiled and executed) to perform functions described herein.

The UE processor 1110 may include an intelligent hardware device, a central processing unit (CPU), a microcontroller, an ASIC, etc. The UE processor 1110 may process information received through the UE transceiver(s) 1130 or information to be sent to the UE transceiver(s) 1130 for transmission via the UE antenna(s) 1140. The UE processor 1110 may handle, alone or in connection with the UE wireless communications manager 910-*b*, various aspects of communicating over (or managing communications over) a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner).

The UE transceiver(s) 1130 may include a modem configured to modulate packets and provide the modulated packets to the UE antenna(s) 1140 for transmission, and to demodulate packets received from the UE antenna(s) 1140. The UE transceiver(s) 1130 may, in some examples, be implemented as one or more UE transmitter modules and one or more separate UE receiver modules. The UE transceiver(s) 1130 may support communications in the licensed radio frequency spectrum or the unlicensed radio frequency spectrum. The UE transceiver(s) 1130 may be configured to communicate bi-directionally, via the UE antenna(s) 1140, with one or more of the base stations 105 described with reference to FIG. 1 or 2, or the apparatus 1200 described with reference to FIG. 12. While the UE 115-*b* may include a single UE antenna, there may be examples in which the UE 115-*b* may include multiple UE antennas 1140.

The UE wireless communications manager 910-*b* may be an example of UE wireless communications managers 910 described with reference to FIGS. 9 and 10, and may manage various aspects of implementing an uplink descriptor channel as described herein. The UE wireless communications manager 910-*b* may be in communication with other components of the UE 115-*b*, directly or indirectly, over the one or more buses 1135. The UE wireless communications manager 910-*b*, or portions of it, may include a processor, or some or all of the functions of the UE wireless communications manager 910-*b* may be performed by the UE processor 1110 or in connection with the UE processor 1110.

Figure 12:
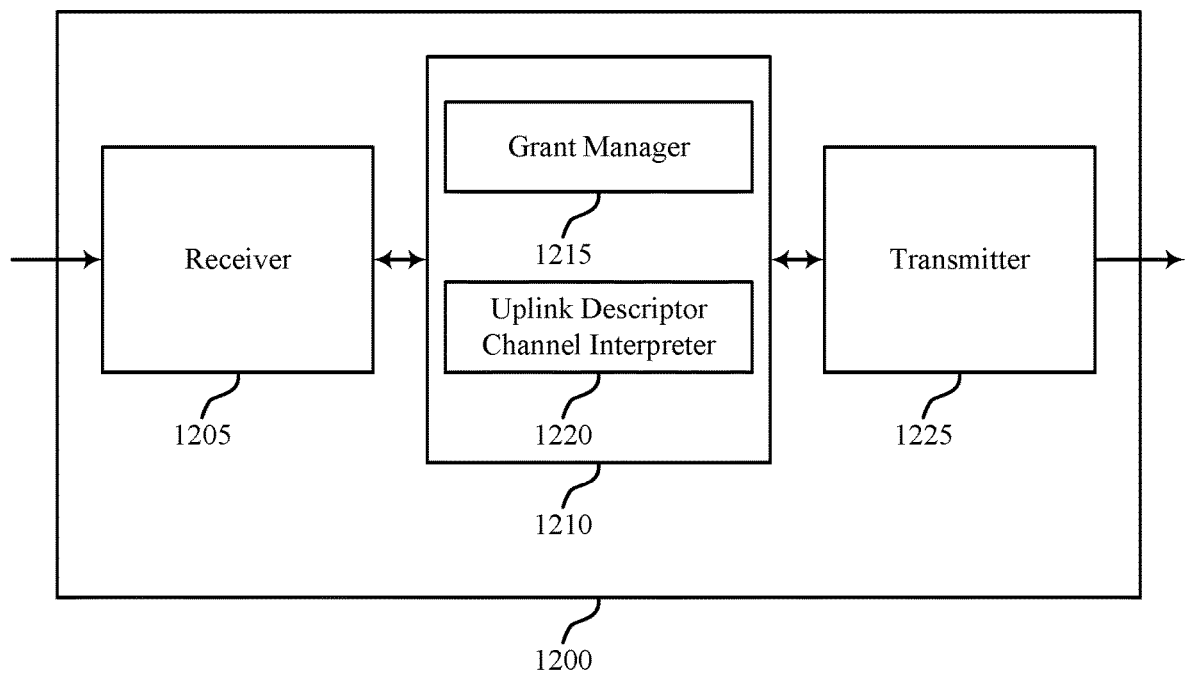
FIG. 12 shows a block diagram of a base station for use in wireless communication, employing an uplink descriptor channel, in accordance with aspects of the present disclosure.

FIG. 12 shows a block diagram of an apparatus 1200 for use in wireless communication, employing an uplink descriptor channel, in accordance with aspects of the present disclosure. Apparatus 1200 may be an example of aspects of a base station 105 as described with reference to FIG. 1, 2, 3, or 14. Apparatus 1200 may include a receiver 1205, a base station wireless communications manager 1210 and a transmitter 1225. Each of these components may be in communication with each other.

The receiver 1205 may receive information such as packets, user data, or control information associated with various information channels (e.g., control channels, data channels, information related to implementing an uplink descriptor channel, etc.). For example, the receiver may receive uplink transmissions from a UE 115, which may include uplink data and an uplink descriptor channel as described herein. Information may be passed on to other components of the device. The receiver 1205 may be an example of aspects of the base station transceiver module(s) 1430 and/or antenna(s) 1440 described with reference to FIG. 14.

The base station wireless communications manager 1210 may manage various aspects of wireless communications at the apparatus 1200. For example, the base station wireless communications manager 1210 may include a grant manager 1215 and an uplink descriptor channel interpreter 1220.

The grant manager 1215 may be configured to provide grants (e.g., uplink and/or downlink grants) to be transmitted to one or more UEs 115 by the transmitter 1225. For example, the grant manager 1215 may configure an uplink grant for a UE that has sent the apparatus a scheduling request for uplink transmissions. In some examples the grant manager may allocate resources of a radio frequency spectrum, which may include uplink data channel resources of a shared radio frequency spectrum band. The uplink grant may include an indication of the allocated resources and/or how to configure an uplink transmission (e.g., an uplink configuration determined by the grant manager 1215, which may indicate a granted number of transmission intervals, a granted number of frequency channels, a granted MCS, etc.) employing the allocated resources.

The uplink descriptor channel interpreter 1220 may be configured to manage aspects of interpreting an uplink descriptor channel received from a UE 115 by the receiver 1205. For example, the uplink descriptor channel interpreter 1220 may decode the uplink descriptor channel from an uplink transmission, where the uplink descriptor channel may comprise predetermined portions of the uplink transmission known by the uplink descriptor channel interpreter. In some examples, the predetermined portion of the uplink transmission may include a beginning portion of an uplink burst from a UE received by the receiver 1205. The uplink descriptor channel interpreter 1220 may decode indications of how a received uplink transmission has been configured (e.g., one or more parameters indicating an uplink configuration determined by the UE 115 for using the allocated uplink data channel resources for the uplink transmission). For example, the uplink descriptor channel interpreter 1220 may determine, from the received uplink descriptor channel, whether the received uplink transmission includes UCI from the UE. In some examples, the uplink descriptor channel interpreter 1220 may determine that no UCI is present in an uplink transmission, despite the grant manager 1215 preparing a downlink grant that was transmitted to the UE which transmitted the uplink descriptor channel. In such examples, the uplink descriptor channel interpreter 1220 may determine that the downlink grant was not received by the UE, and provide a corresponding indication to one or more modules of the base station wireless communications manager 1210 which may modify downlink transmissions accordingly (e.g., retransmit the downlink grant and associated downlink data).

Additionally or alternatively, in some examples the uplink descriptor channel interpreter 1220 may determine that the received uplink transmission has been sent with an uplink configuration different than an uplink configuration determined by the grant manager 1215. For example, the uplink descriptor channel interpreter 1220 may determine that the received uplink transmission employs a number of transmission intervals (e.g., a number of subframes), a number of frequency channels, and/or an MCS different than those determined by the grant manager 1215 and included in the associated uplink grant. The uplink descriptor channel interpreter may provide the interpreted indications of the uplink descriptor channel to other portions of the base station wireless communications manager 1210 to facilitate further decoding of the received uplink transmission.

The transmitter 1225 may transmit signals received from other components of the apparatus 1200. For example, the transmitter 1225 may be configured to transmit grants (e.g., uplink and/or downlink grants), as received from the grant manager 1215. In some examples, the transmitter 1225 may be collocated with a receiver in a transceiver module. For example, the transmitter 1225 may be an example of aspects of the base station transceiver(s) 1430 and/or antenna(s) 1440 described with reference to FIG. 14.

Figure 13:
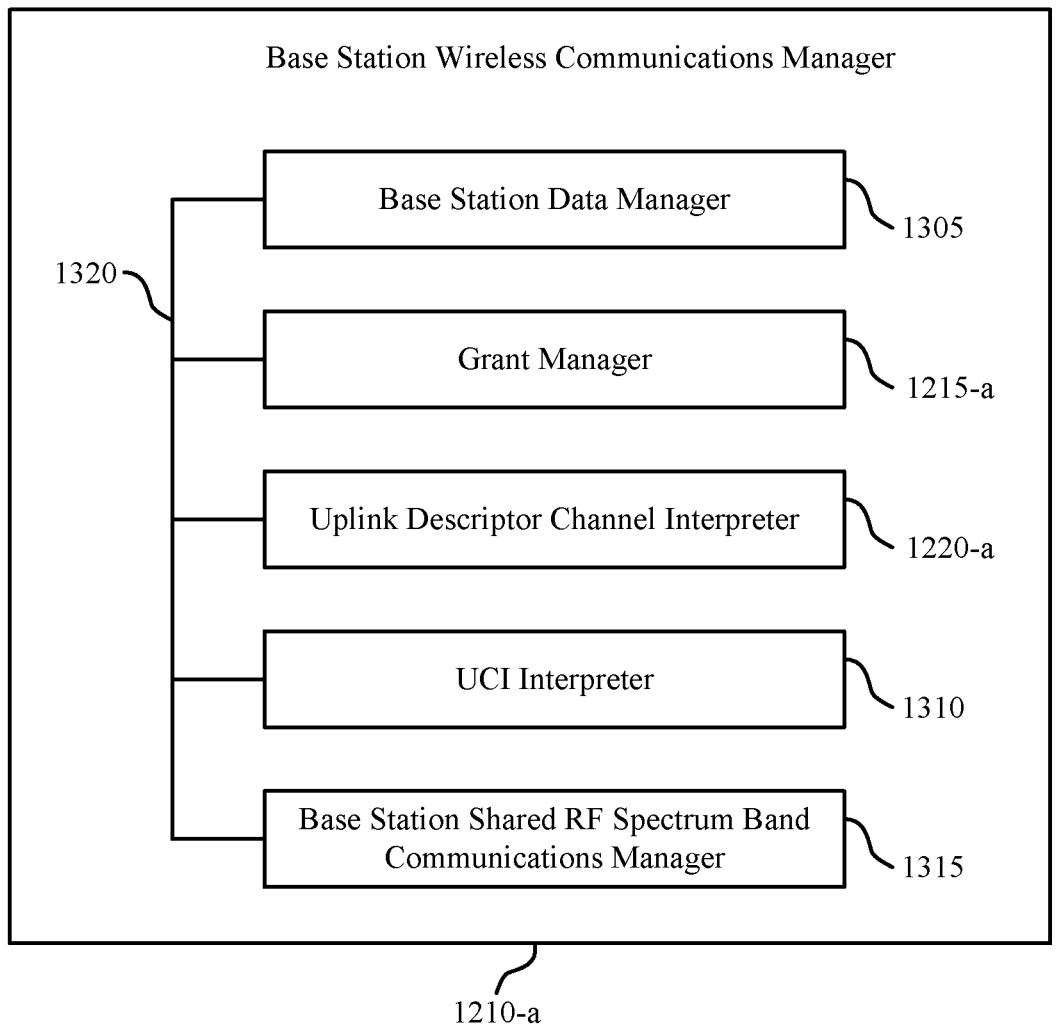
FIG. 13 shows a block diagram of a base station wireless communications manager configured for employing an uplink descriptor channel, in accordance with aspects of the present disclosure.

FIG. 13 shows a block diagram 1300 of a base station wireless communications manager 1210-a configured for employing an uplink descriptor channel, in accordance with aspects of the present disclosure. The base station wireless communications manager 1210-a may be an example of aspects of base station wireless communications manager 1210 described with reference to FIG. 12. The base station wireless communications manager 1210-a may also be an example of aspects of the base station wireless communications manager 1210-b described with reference to FIG. 14. The base station wireless communications manager 1210-a may include a base station data manager 1305, a grant manager 1215-a, an uplink descriptor channel interpreter 1220-a, a UCI interpreter 1310, and a base station shared radio frequency spectrum band communications manager 1315. Each of these modules may communicate, directly or indirectly, with one another (e.g., via one or more buses).

The base station data manager 1305 may be configured to manage aspects of uplink and downlink data for a base station 105 comprising the base station wireless communications manager 1210-a. For example, the base station data manager 1305 may receive downlink information for one or more UEs 115 served by the base station 105 (e.g., downlink information from a core network, control information, etc.), and buffer the downlink information for transmission to the UEs 115. When downlink information is present, the base station data manager 1305 may provide an indication to the grant manager 1215-a to prepare a downlink grant to be sent with the downlink information. In some examples, the base station data manager 1305 may receive and decode portions of an uplink transmission. For example, the base station data manager 1305 may receive and decode portions of an uplink transmission according to indications received in an uplink descriptor channel (e.g., indicating an uplink configuration determined by a UE 115) and decoded by the uplink descriptor channel interpreter 1220-a.

The grant manager 1215-a may be an example of the grant manager 1215 described with reference to FIG. 12, and may be configured to configure grants (e.g., uplink and/or downlink grants) for transmissions with a UE 115. For example, the grant manager 1215-a may configure an uplink grant for a UE 115 that has sent the apparatus a scheduling request for uplink transmissions, where such a request may be received in UCI transmitted by the UE 115, and decoded by the UCI interpreter 1320. In some examples the grant manager may allocate resources of a radio frequency spectrum, which may include a shared radio frequency spectrum band. The uplink grant may include an indication of the allocated resources and/or how to configure an uplink transmission (e.g., an uplink configuration determined by the grant manager 1215, which may indicate a granted number of transmission intervals, a granted number of frequency channels, a granted MCS, etc.) employing the allocated resources. Additionally or alternatively, the grant manager 1215-a may receive an indication from a base station data manager 1305 that downlink data has been buffered for transmission, and subsequently prepare a downlink grant. In some examples the grant manager 1215-a may receive an indication of an uplink descriptor channel, as decoded by the uplink descriptor channel interpreter 1220-a, that an uplink transmission employs a number of transmission intervals and/or a number of frequency channels different from those allocated in an associated uplink grant. When the number of transmission intervals and/or the number of frequency channels is fewer than the number allocated by the grant manager 1215-a, the grant manager 1215-a may reallocate the resources for subsequent transmissions. For example, the grant manager 1215-a may coordinate with the base station shared radio frequency spectrum band communications manager 1315 to reallocate the unused resources to a new LBT frame (e.g., ending an LBT frame associated with the uplink grant at a number of subframes fewer than originally allocated to the LBT frame)

The uplink descriptor channel interpreter 1220-a may be an example of the uplink descriptor channel interpreter 1220 described with reference to FIG. 12, and may be configured to manage aspects of interpreting an uplink descriptor channel received from a UE 115 by a receiver 1205. For example, the uplink descriptor channel interpreter 1220-a may decode the uplink descriptor channel from an uplink transmission, where the uplink descriptor channel may comprise predetermined portions of the uplink transmission known by the uplink descriptor channel interpreter. In some examples, the predetermined portion of the uplink transmission may include a beginning portion of an uplink burst from a UE received by a receiver. The uplink descriptor channel interpreter 1220-a may decode indications of how a received uplink transmission has been configured (e.g., one or more parameters indicating an uplink configuration determined by the UE 115 for using the allocated uplink data channel resources for the uplink transmission). For example, the uplink descriptor channel interpreter 1220-a may determine, from the uplink descriptor channel, whether the received uplink transmission contains UCI from the UE. In some examples, the uplink descriptor channel interpreter 1220 may determine that no UCI is present in an uplink transmission, despite the grant manager 1215 preparing a downlink grant that was transmitted to the UE which transmitted the uplink descriptor channel. In such examples, the uplink descriptor channel interpreter 1220 may determine that the downlink grant was not received by the UE, and provide a corresponding indication to one or more modules of the base station wireless communications manager 1210 which may modify downlink transmissions accordingly. For example, the uplink descriptor channel interpreter 1220-*a* may provide an indication to the base station data manager 1305 and/or the grant manager 1215-*a* to prepare the downlink grant and associated downlink data for retransmission.

Additionally or alternatively, in some examples the uplink descriptor channel interpreter 1220-*a* may determine that the received uplink transmission has been sent with a configuration different than a configuration determined by the grant manager 1215-*a*. For example, the uplink descriptor channel interpreter 1220-*a* may determine that the received uplink transmission employs a number of transmission intervals (e.g., a number of subframes), a number of frequency channels, and/or an MCS different than those included by the grant manager 1215-*a* in the associated uplink grant. The uplink descriptor channel interpreter may provide the interpreted indications of the uplink descriptor channel to other portions of the base station wireless communications manager 1210-*a*, such as the base station data manager 1305 and/or the UCI interpreter 1310 to facilitate further decoding of the received uplink transmission.

The UCI interpreter 1310 may be configured to interpret UCI received from a UE in an uplink transmission. For example, the UCI interpreter 1310 may decode UCI from an uplink transmission received from a UE 115. In various examples, the UCI interpreter 1310 may decode HARQ ACK/NACK, CQI, MIMO feedback (RI, PMI, etc.), scheduling requests for uplink transmissions, an MCS indicator (e.g., an indication of a BPSK or QPSK used for modulation), or any other information included in UCI received from a UE. In some examples, the UCI interpreter 1310 may decode UCI according to a UCI format indicated in an uplink descriptor channel, and such an indication may be received, for example, from the uplink descriptor channel interpreter 1220-*a*.

The base station shared radio frequency spectrum band communications manager 1315 may manage aspects of transmitting downlink transmissions over a shared radio frequency resource. For example, the base station shared radio frequency spectrum band communications manager 1315 may manage aspects of performing a CCA, and/or an eCCA prior to a base station 105 comprising the base station wireless communications manager 1210-*a* transmitting downlink transmissions via a shared radio frequency spectrum. In some examples the base station shared radio frequency spectrum band communications manager 1315 may receive an indication from the grant manager 1215-*a* and/or the uplink descriptor channel interpreter 1220-*a* that radio frequency spectrum resources fewer than those allocated for uplink transmission are employed by a UE, and the base station shared radio frequency spectrum band communications manager 1315 may configure procedures to initiate a new LBT frame (e.g., performing a DCCA, etc.). Thus, the base station shared radio frequency spectrum band communications manager 1315 can coordinate with other devices of the base station wireless communications manager to employ radio frequency spectrum resources that have been reallocated as a result of indications received in an uplink descriptor channel.

The components of the apparatus 1200, and base station wireless communications managers 1210 described with reference to FIGS. 12 and 13, may, individually or collectively, be implemented with at least one ASIC adapted to perform some or all of the applicable features in hardware. Alternatively, the features may be performed by one or more other processing units (or cores), on at least one IC. In other examples, other types of integrated circuits may be used (e.g., Structured/Platform ASICs, a FPGA, or another semi-custom IC), which may be programmed in any manner known in the art. The features may also be implemented, in whole or in part, with instructions embodied in a memory, formatted to be executed by one or more general or application-specific processors.

Figure 14:
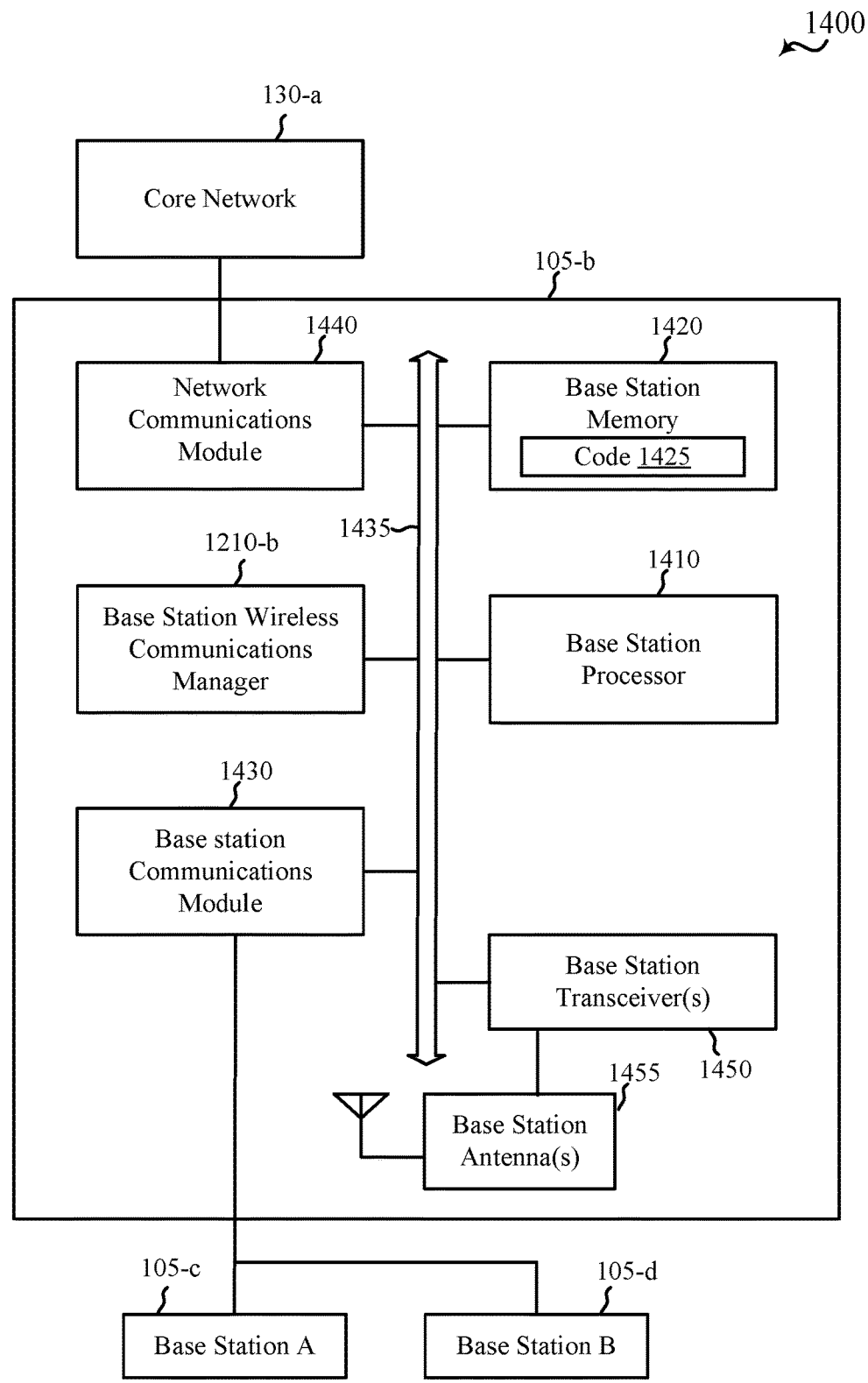
FIG. 14 shows a block diagram of a base station for use in wireless communication, configured for employing an uplink descriptor channel, in accordance with aspects of the present disclosure.

FIG. 14 shows a block diagram 1400 of a base station 105-*b* for use in wireless communication, configured for employing an uplink descriptor channel, in accordance with aspects of the present disclosure. The base station 105-*b* may have various configurations and may be included or be part of an eNB as described herein. In some examples, the base station 105-*b* may be an example of aspects of one or more of the base stations 105 described with reference to FIG. 1,2 or 3, or aspects of the apparatuses 1200 or 1300 described with reference to FIGS. 12 and 13. The base station 105-*b* may be configured to implement at least some of the base or apparatus features and functions described with reference to FIG. 1-8, 12, or 13. Base station 105-*b* may include a base station wireless communications manager 1210-*b*, which may be an example of a base station wireless communications manager 1210 described with reference to FIG. 12 or 13. Base station 105-*b* may also include components for bi-directional voice and data communications including components for transmitting communications and components for receiving communications. For example, base station 105-*b* may communicate bi-directionally with base station 105-*c* or base station 105-*d*.

In some cases, base station 105-*b* may have one or more wired backhaul links. Base station 105-*b* may have a wired backhaul link (e.g., S1 interface, etc.) to the core network 130-*a*. Base station 105-*b* may also communicate with other base stations 105, such as base station 105-*c* and base station 105-*d* via inter-base station backhaul links (e.g., an X2 interface). Each of the base stations 105 may communicate with UEs 115 using the same or different wireless communications technologies. In some cases, base station 105-*b* may communicate with other base stations such as 105-*c* or 105-*d* utilizing base station communication module 1430. In some examples, base station communication module 1430 may provide an X2 interface within an LTE/LTE-A wireless communication network technology to provide communication between some of the base stations 105-*b*. In some examples, base station 105-*b* may communicate with other base stations through core network 130-*a*, which may be an example of the core network 130 described with reference to FIG. 1. In some cases, base station 105-*b* may communicate with the core network 130-*a* through network communications module 1440.

The base station 105-*b* may include a base station processor 1410, a base station memory 1420, at least one base transceiver (represented by base transceiver(s) 1430), at least one base station antenna (represented by base station antenna(s) 1440), and a base station wireless communications manager 1210-*b*. Each of these components may be in communication with each other, directly or indirectly, over one or more buses 1435.

The base station memory 1420 may include RAM and/or ROM. The base station memory 1420 may store computer-readable, computer-executable software/firmware code 1425 containing instructions that are configured to, when executed, cause the base station processor 1410 to perform various functions described herein (e.g., aspects of implementing an uplink descriptor channel, etc.). Alternatively, the computer-readable, computer-executable software/firmware code 1425 may not be directly executable by the base station processor 1410, but may be configured to cause a computer (e.g., when compiled and executed) to perform functions described herein.

The base station processor 1410 may include an intelligent hardware device, a CPU, a microcontroller, an ASIC, etc. The base station processor 1410 may process information received through the base station transceiver(s) 1450 or information to be sent to the base station transceiver(s) 1450 for transmission through the base station antenna(s) 1455. The base station processor 1410 may handle, alone or in connection with the base station wireless communications manager 1210-*b*, various aspects of communicating over (or managing communications over) a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner).

The base station transceiver(s) 1450 may include a modem configured to modulate packets and provide the modulated packets to the base station antenna(s) 1455 for transmission, and to demodulate packets received from the base station antenna(s) 1455. The base station transceiver(s) 1450 may, in some examples, be implemented as one or more base station transmitter modules and one or more separate base station receiver modules. The base station transceiver(s) 1450 may support communications in the licensed radio frequency spectrum or the unlicensed radio frequency spectrum. The base station transceiver(s) 1450 may be configured to communicate bi-directionally, via the base station antenna(s) 1455, with one or more of the UEs 115 described with reference to FIG. 1, 2, 3, or 11. While the base station 1405 may include a single base station antenna, there may be examples in which the base station 1405 may include multiple base station antennas 1455.

The base station wireless communications manager 1210-*b* may be an example of base station wireless communications managers 1210 described with reference to FIGS. 12 and 13, and may manage various aspects of implementing an uplink descriptor channel as described herein. The base station wireless communications manager 1210-*b* may be in communication with other components of the base station 105-*b*, directly or indirectly, over the one or more buses 1435. The base station wireless communications manager 1210-*b*, or portions of it, may include a processor, or some or all of the functions of the base station wireless communications manager 1210-*b* may be performed by the base station processor 1410 or in connection with the base station processor 1410.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an AP, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a CSG, UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink (DL) transmissions described herein may also be called forward link transmissions while the uplink transmissions may also be called reverse link transmissions. Each communication link described herein including, for example, wireless communications environment 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for descriptor channel design for uplink channels in a shared radio frequency spectrum band. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration). Thus, the functions described herein may be performed by one or more other processing units (or cores), on at least one IC. In various examples, different types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communications at a user equipment (UE) comprising:
  receiving, from a base station, an uplink grant identifying uplink data channel resources identified by the base station as available for the UE and a first uplink configuration for using the identified uplink data channel resources, the identified uplink data channel resources comprising one or more granted transmission intervals for one or more channels of a shared radio frequency spectrum band;
  determining, by the UE, one or more parameters for a second uplink configuration for using the identified uplink data channel resources for an uplink data message, the determined one or more parameters different from a corresponding one or more parameters of the first uplink configuration;
  transmitting, in an uplink transmission using a first portion of the identified uplink data channel resources, the uplink data message according to the second uplink configuration; and
  transmitting, in the uplink transmission using a second portion of the identified uplink data channel resources, an uplink descriptor channel indicating the determined one or more parameters of the second uplink configuration, the determined one or more parameters being used to transmit the uplink data message in the uplink transmission.

2. The method of claim 1, wherein the uplink descriptor channel comprises an indication of whether uplink control information (UCI) from the UE is present in the uplink data message or the uplink descriptor channel.

3. The method of claim 2, wherein the uplink descriptor channel comprises an indication of a format of UCI present in the uplink data message or the uplink descriptor channel.

4. The method of claim 2, further comprising:
  rate matching the UCI around the uplink descriptor channel prior to transmitting the uplink descriptor channel.

5. The method of claim 2, further comprising:
  rate matching the uplink data message around the uplink descriptor channel and the UCI prior to transmitting the uplink data message.

6. The method of claim 2, further comprising:
  configuring the UCI to be transmitted with a same rank as the uplink data message, a same precoding matrix indicator (PMI) as the uplink data message, a same modulation order as the uplink data message, or a combination thereof.

7. The method of claim 1, wherein the uplink descriptor channel comprises an indication that the uplink descriptor channel or the uplink data message spans a number of transmission intervals that is different from a number of the one or more granted transmission intervals.

8. The method of claim 1, wherein the uplink descriptor channel comprises an indication that the UE employs a modulation and coding scheme (MCS) that is different from an MCS included in the uplink grant.

9. The method of claim 1, wherein the uplink descriptor channel comprises an indication that the uplink descriptor channel or the uplink data message comprises a number of channels that is different from a number of channels of the one or more channels of the identified uplink data channel resources.

10. The method of claim 1, wherein the identified uplink data channel resources comprise a plurality of channels of the shared radio frequency spectrum band, and the uplink descriptor channel is spread across one or more of the plurality of channels.

11. The method of claim 1, wherein the uplink descriptor channel is transmitted by the UE in a predetermined portion of the identified uplink data channel resources.

12. The method of claim 11, wherein the predetermined portion comprises a beginning portion of the identified uplink data channel resources.

13. The method of claim 1, further comprising:
  configuring the uplink descriptor channel to be transmitted with a same rank as the uplink data message, a same precoding matrix indicator (PMI) as the uplink data message, a same modulation order as the uplink data message, or a combination thereof.

14. The method of claim 1, further comprising:
selecting a set of channels from the one or more channels of the identified uplink data channel resources; and
performing a respective clear channel assessment (CCA) for each channel from the selected set of channels, wherein the uplink descriptor channel comprises an indication of channels from the selected set of channels for which the respective CCA was successful.

15. A method of wireless communication comprising:
allocating uplink data channel resources for a user equipment (UE), the allocated uplink data channel resources comprising one or more granted transmission intervals for one or more channels of a shared radio frequency spectrum band;
transmitting an uplink grant identifying the allocated uplink data channel resources and a first uplink configuration for using the allocated uplink data channel resources; and
receiving an uplink data message from the UE in an uplink transmission over a first portion of the allocated uplink data channel resources according to a second uplink configuration; and
receiving, in the uplink transmission over a second portion of the identified uplink data channel resources, an uplink descriptor channel indicating one or more parameters of the second uplink configuration, the one or more parameters being used to transmit the uplink data message in the uplink transmission and being associated with using the allocated uplink data channel resources for the uplink data message.

16. The method of claim 15, wherein the uplink descriptor channel comprises an indication of whether uplink control information (UCI) from the UE is present in the uplink data message.

17. The method of claim 16, further comprising:
transmitting a downlink grant identifying downlink information for the UE; and
determining that the downlink grant was not received by the UE based at least in part on the uplink descriptor channel indicating that no UCI is present.

18. The method of claim 15, wherein the uplink descriptor channel comprises an indication that the uplink data message or the uplink descriptor channel is being transmitted over a number of transmission intervals that is different from a number of the one or more granted transmission intervals.

19. The method of claim 18, further comprising:
reallocating a portion of the number of the one or more granted transmission intervals for the one or more channels of the shared radio frequency spectrum band to subsequent transmissions based at least in part on the indication that the uplink data message or the uplink descriptor channel has been transmitted over the number of transmission intervals that is different from the number of the one or more granted transmission intervals.

20. The method of claim 15, wherein the uplink grant comprises an indicator of a modulation and coding scheme (MCS), and wherein the uplink descriptor channel comprises an indication that the uplink data message or the uplink descriptor channel is transmitted with an MCS that is different from the MCS indicated by the uplink grant.

21. The method of claim 15, wherein the uplink grant comprises a number of granted channels, and wherein the uplink descriptor channel comprises an indication that the uplink data message or the uplink descriptor channel is being transmitted over a number of channels that is different from the number of granted channels.

22. The method of claim 15, further comprising:
decoding the uplink descriptor channel from a predetermined portion of the received uplink data message.

23. The method of claim 15, further comprising:
decoding at least a portion of the received uplink data message based at least in part on the uplink descriptor channel.

24. An apparatus for wireless communication by a user equipment (UE), comprising:
a processor;
memory coupled with the processor; and
instructions stored in the memory and operable, when executed by the processor, to cause the apparatus to:
receive, from a base station, an uplink grant identifying uplink data channel resources identified by the base station as available for the UE and a first uplink configuration for using the identified uplink data channel resources, the identified uplink data channel resources comprising one or more granted transmission intervals for one or more channels of a shared radio frequency spectrum band;
determine, by the UE, one or more parameters for a second uplink configuration for using the identified uplink data channel resources for an uplink data message, the determined one or more parameters different from a corresponding one or more parameters of the first uplink configuration;
transmit, in an uplink transmission using a first portion of the identified uplink data channel resources, the uplink data message according to the second uplink configuration; and
transmitting, in the uplink transmission using a second portion of the identified uplink data channel resources, an uplink descriptor channel indicating the determined one or more parameters of the second uplink configuration, the determined one or more parameters being used to transmit the uplink data message in the uplink transmission.

25. The apparatus of claim 24, wherein the uplink descriptor channel comprises an indication of whether uplink control information (UCI) from the UE is present in the uplink data message or the uplink descriptor channel, or an indication that the uplink data message or the uplink descriptor channel spans a number of transmission intervals that is different from a number of the one or more granted transmission intervals, or an indication that the UE employs a modulation and coding scheme (MCS) that is different from an MCS included in the uplink grant, or an indication that the uplink data message or the uplink descriptor channel comprises a number of channels that is different from a number of channels of the identified uplink data channel resources, or a combination thereof.

26. The apparatus of claim 24, wherein the instructions are operable, when executed by the processor, to cause the apparatus to:
configure the uplink descriptor channel to be transmitted with a same rank as the uplink data message, a same precoding matrix indicator (PMI) as the uplink data message, a same modulation order as the uplink data message, or a combination thereof.

27. The apparatus of claim 24, wherein the instructions are operable to cause the processor to:
select a set of channels from the one or more channels of the identified uplink data channel resources; and
perform a respective clear channel assessment (CCA) for each channel from the selected set of channels, wherein the uplink descriptor channel comprises an indication of channels from the selected set of channels for which the respective CCA was successful.

28. An apparatus for wireless communication, comprising:
   a processor;
   memory coupled with the processor; and
   instructions stored in the memory and operable, when executed by the processor, to cause the apparatus to:
      allocate uplink data channel resources for a user equipment (UE), the allocated uplink data channel resources comprising one or more granted transmission intervals for one or more channels of a shared radio frequency spectrum band;
      transmit an uplink grant identifying the allocated uplink data channel resources and a first uplink configuration for using the allocated uplink data channel resources; and
      receive an uplink data message from the UE in an uplink transmission over a first portion of the allocated uplink data channel resources according to a second uplink configuration; and
      receive, in the uplink transmission over a second portion of the identified uplink data channel resources, an uplink descriptor channel indicating one or more parameters of the second uplink configuration, the determined one or more parameters being used to transmit the uplink data message in the uplink transmission and being associated with using the allocated uplink data channel resources for the uplink data message.

29. The apparatus of claim 28, wherein the uplink descriptor channel comprises an indication of whether uplink control information (UCI) from the UE is present in the uplink data message or the uplink descriptor channel, or an indication that the uplink data message or the uplink descriptor channel spans a number of transmission intervals that is different from a number of the one or more granted transmission intervals, or an indication that the UE employs a modulation and coding scheme (MCS) that is different from an MCS included in the uplink grant, or an indication that the uplink data message or the uplink descriptor channel comprises a number of channels that is different from a number of channels of the allocated uplink data channel resources, or a combination thereof.

30. The apparatus of claim 28, wherein the instructions are further operable, when executed by the processor, to cause the apparatus to:
   transmit a downlink grant identifying downlink information for the UE; and
   determine that the downlink grant was not received by the UE based at least in part on the uplink descriptor channel indicating that no uplink control information (UCI) is present.

* * * * *